US006549869B1

(12) United States Patent
Piety et al.

(10) Patent No.: US 6,549,869 B1
(45) Date of Patent: Apr. 15, 2003

(54) EXPERT ANALYSIS MODULES FOR MACHINE TESTING

(75) Inventors: Kenneth R. Piety, Knoxville, TN (US); Todd W. Reeves, Knoxville, TN (US); Jason M. Edwards, Knoxville, TN (US); Michael D. Rich, Powell, TN (US)

(73) Assignee: CSI Technology, Inc., Wilmington, DE (US)

( * ) Notice: Subject to any disclaimer, the term of this patent is extended or adjusted under 35 U.S.C. 154(b) by 128 days.

(21) Appl. No.: 09/597,508

(22) Filed: Jun. 20, 2000

(51) Int. Cl.$^7$ ................................................ G01M 7/00
(52) U.S. Cl. ........................ 702/122; 702/56; 340/635
(58) Field of Search .............................. 702/35, 36, 33, 702/34, 122, 123, 182, 183, 184, 185, 56; 340/870.16, 500, 635

(56) References Cited

U.S. PATENT DOCUMENTS

| | | | | |
|---|---|---|---|---|
| 5,602,761 A | * | 2/1997 | Spoerre et al. | 702/179 |
| 5,633,811 A | | 5/1997 | Canada et al. | |
| 5,808,903 A | * | 9/1998 | Schiltz et al. | 340/683 |
| 5,870,699 A | | 2/1999 | Canada et al. | |
| 5,943,634 A | * | 8/1999 | Piety et al. | 702/56 |
| 5,956,658 A | * | 9/1999 | McMahon | 235/376 |
| 6,006,164 A | * | 12/1999 | McCarty et al. | 702/56 |
| 6,041,287 A | * | 3/2000 | Dister et al. | 702/182 |
| 6,078,874 A | * | 6/2000 | Piety et al. | 702/122 |
| 6,192,325 B1 | * | 2/2001 | Piety et al. | 702/184 |
| 6,208,944 B1 | * | 3/2001 | Franke et al. | 340/680 |
| 6,257,066 B1 | * | 7/2001 | Chandler et al. | 73/602 |
| 6,295,510 B1 | * | 9/2001 | Discenzo | 310/50 |
| 6,298,308 B1 | * | 10/2001 | Reid et al. | 702/188 |

OTHER PUBLICATIONS

Lakeman et al., "Check–Mate Expert An Expert System for Vibration Analysis", IEEE, 1993.*

* cited by examiner

*Primary Examiner*—Patrick Assouad
(74) *Attorney, Agent, or Firm*—Luedeka, Neely & Graham, P.C.

(57) ABSTRACT

A hand-held apparatus gathers and analyzes test data associated with rotating electric machines, where the test data is indicative of one or more operational characteristics of the mechanical equipment. The apparatus, which is operable to be carried by an operator from one machine to another along a test route, includes a sensor input port for receiving a sensor signal from a sensor, where the sensor signal is indicative of one or more operational characteristics of the rotating electric machines. The apparatus also includes a signal conditioning circuit for receiving the sensor signal, and for conditioning the sensor signal to produce a conditioned signal which is appropriate in format to be digitally processed. A processor, which is coupled to the signal conditioner, receives and processes the conditioned signal according to processing instructions and processing parameters to produce a test spectrum. The processing parameters determine one or more characteristics of the test spectrum. A memory device, which is coupled to the processor, stores a plurality of executable test expert modules, each containing the processing instructions for processing the conditioned signal in a particular way to determine one or more of the operational characteristics of the rotating electric machines. An operator input device is coupled to the processor for receiving input from the operator to select one of the test expert modules to be executed to process the conditioned signal according to the processing instructions contained in the selected module. The apparatus further includes a display device for displaying the test spectrum to the operator. The test expert modules contain processing instructions for determining whether the processing parameters have been set according to a predetermined configuration for a particular test point on the test route, and for processing the conditioned signal in a way dependent upon whether or not the processing parameters have been set according to such a predetermined configuration.

20 Claims, 17 Drawing Sheets

PLOTDATA (Manual Plot Functions) – D:\Databases43\VibTech\bullrun.rbm

File Edit View Hierarchy Tools Help

| Equipment: | FD1A | → | Motor | → | FD Fan 1A | Vertical | | | ( 11 SPECTRA) |
|---|---|---|---|---|---|---|---|---|---|
| POINT: | M2V | → | | Inboard | | | | | |
| DATE | TIME | Hz | LINES | RPM | LOAD | TAG | SPECTRAL LABEL |
| 22-Oct-98 | 12:22 | 1500 | 800 | 1196 | 100.0 | R | |
| 22-Dec-98 | 13:43 | 1500 | 800 | 1190 | 100.0 | R | |
| 04-Feb-99 | 10:45 | 1500 | 800 | 1190 | 100.0 | R | |
| 07-Dec-99 | 10:35 | 1500 | 800 | 1190 | 100.0 | R | |
| 25-Feb-00 | 12:00 | 1500 | 800 | 1190 | 100.0 | R | |
| 10-Mar-00 | 10:22 | 1500 | 800 | 1192 | 100.0 | R | |
| 11-May-00 | 09:05 | 4000 | 3200 | 1192 | 100.0 | A | |
| 11-May-00 | 09:05 | 5000 | 6400 | 1192 | 100.0 | AP | High Frequency Analysis |
| 11-May-00 | 09:06 | 1000 | 3200 | 1192 | 100.0 | AP | Bearing/Gear Analysis - Peakvue |
| 18-May-00 | 10:16 | 1500 | 800 | 1190 | 100.0 | R | |

EXPERT ANALYSIS MODULES FOR MACHINE TESTING

TECHNICAL FIELD

The present invention is generally directed to machine testing. More particularly, the invention is directed to a system for automatically configuring a machine testing device to perform further testing of a machine based upon results of a previous test.

BACKGROUND OF THE INVENTION

Portable vibration analyzers are used to test machines, such as in manufacturing plants, so that any defects in components of the machines may be detected before the defects lead to catastrophic failure. To perform such testing, these vibration analyzers must generally be set up with operational parameters which determine how the vibration data will be collected and analyzed at each machine. Some of these vibration analyzers are preloaded with particular setup parameters to perform particular types of tests on particular machines. With other analyzers, the test operator must have enough experience to know what values to select for the setup parameters for the analyzer to function properly. In some situations, a test operator may collect test data which makes the operator suspect a problem with the machine under test. In such a situation, the operator may wish to perform a special test to gather more information on the suspected problem. However, setting up the analyzer to do a "nonstandard" test may require the operator to be an expert in machine fault testing requiring the specification of 15–20 parameters that control the test setup.

What is needed, therefore, is a machine testing analyzer that automatically determines test setup parameters based on a suspected problem with the machine under test, or based upon a particular portion of a test spectrum designated by the test operator.

SUMMARY OF THE INVENTION

The foregoing and other needs are met by a hand-held apparatus for gathering and analyzing test data associated with mechanical equipment, where the test data is indicative of one or more operational characteristics of the rotating electric machines. The apparatus, which is operable to be carried by an operator from one machine to another along a test route, includes a sensor input port for receiving a sensor signal from a sensor, where the sensor signal is indicative of one or more operational characteristics of the rotating electric machines. The apparatus also includes a signal conditioning circuit for receiving the sensor signal, and for conditioning the sensor signal to produce a conditioned signal which is appropriate in format to be digitally processed. A processor, which is coupled to the signal conditioner, receives and processes the conditioned signal according to processing instructions and processing parameters to produce a test spectrum. The processing parameters determine one or more characteristics of the test spectrum. A memory device, which is coupled to the processor, stores a plurality of executable test expert modules, each containing the processing instructions for processing the conditioned signal in a particular way to determine one or more of the operational characteristics of the rotating electric machines. An operator input device is coupled to the processor for receiving input from the operator to select one of the test expert modules to be executed to process the conditioned signal according to the processing instructions contained in the selected module. The apparatus further includes a display device for displaying the test spectrum to the operator.

In preferred embodiments of the invention, the test expert modules contain processing instructions for determining whether the processing parameters have been set according to a predetermined configuration for a particular test point on the test route, and for processing the conditioned signal in a way dependent upon whether or not the processing parameters have been set according to such a predetermined configuration.

The test expert modules have the ability to alter the data collection set-up methods based on the data that has already been collected by the analyzer. The test expert modules, in essence, learn from the collected data.

In some preferred embodiments, the test expert modules contain processing instructions for setting a maximum frequency and a resolution of the test spectrum based upon whether the processing parameters have been set according to a predetermined configuration for a particular test point on the test route. One test expert module gives the operator the ability to invoke a Turning Speed Detection test. This test expert module can also be invoked intelligently when the equipment to be monitored is defined as a variable speed machine.

BRIEF DESCRIPTION OF THE DRAWINGS

Further advantages of the invention will become apparent by reference to the detailed description of preferred embodiments when considered in conjunction with the drawings, which are not to scale, wherein like reference characters designate like or similar elements throughout the several drawings as follows:

FIG. 23 depicts a display screen showing a list of labeled spectral data sets according to a preferred embodiment of the invention.

DETAILED DESCRIPTION OF THE PREFERRED EMBODIMENTS

Figure 1:
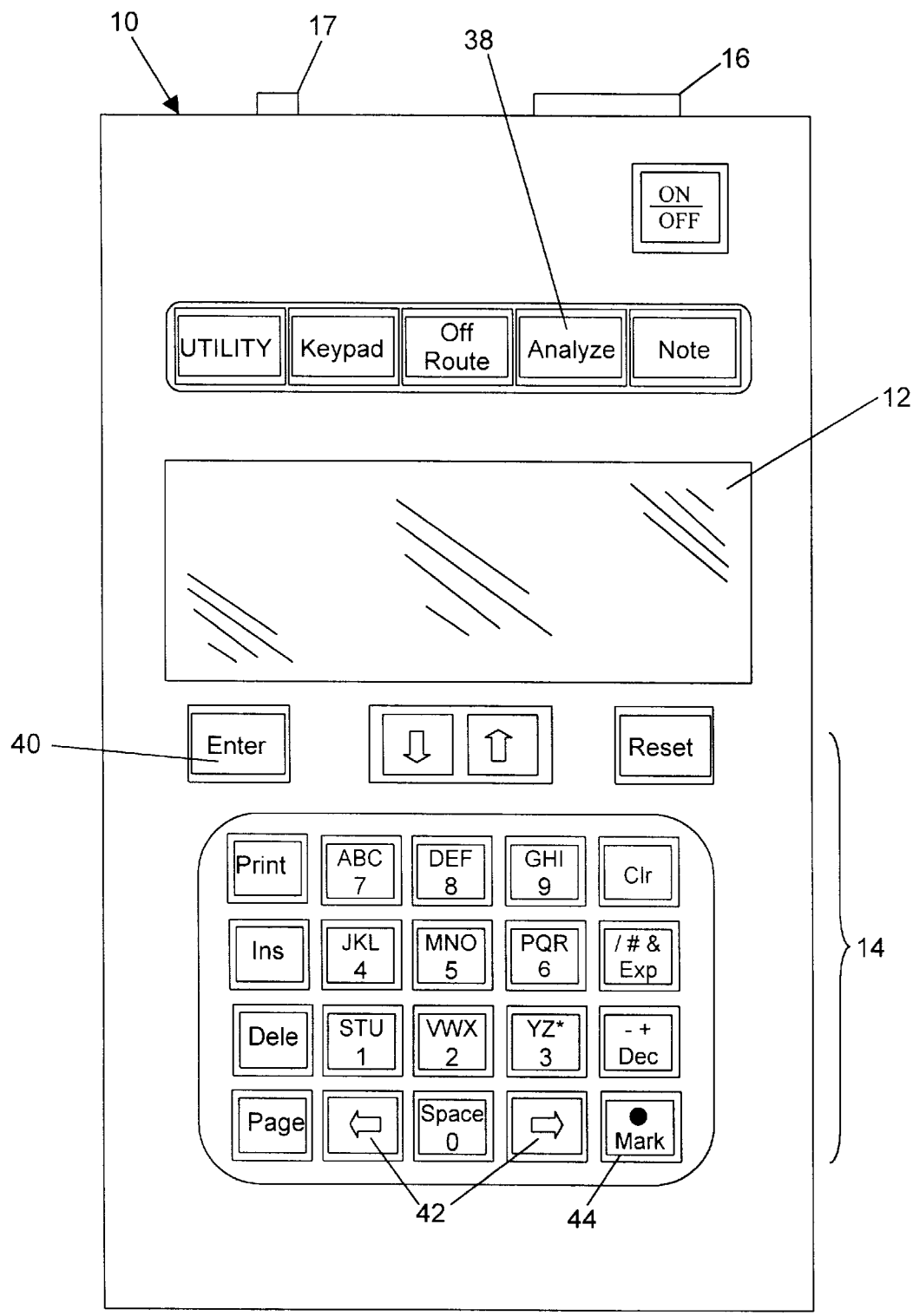
FIG. 1 depicts a machine testing device according to a preferred embodiment of the invention.

Shown in FIG. 1 is a hand-held data collector and analyzer 10 for testing machines, such as in a manufacturing plant. As described in more detail hereinafter, a test operator may use an analyzer, such as the analyzer 10 shown in FIG. 1, to collect and analyze data that is indicative of the operational characteristics of machines along a testing route within the manufacturing plant. If the collected data indicates that there may be a problem with the operation of a machine, the operator may run "expert" modules to setup the analyzer 10 to collect further data to help in finding the nature and cause of the problem. It is also possible for the operator to determine an expert module should be run before any data has been collected. These expert modules are described in more detail below.

The analyzer 10 includes a keyboard 14 or other form of user interface disposed on the face of the analyzer 10 adjacent to a display 12. Control of the analyzer 10 is achieved through the keyboard 14 in combination with the display 12. In a typical operation, set-up conditions for a number of machines on a testing route are downloaded into the analyzer 10 from a base computer through a connector 16 located at the top of the analyzer 10. Connector 16 is preferably, but not limited to, an RS-232 compatible communications port that is also used as a sensor input port to receive signals from sensors, such as vibration transducers. A connector 17 provides an additional input channel for receiving signals, such as an RPM signal from a tachometer. Using the keyboard 14 and the display 12, the operator may cause the analyzer 10 to incrementally step through the downloaded route of machines, or independent analyzer functions may be invoked that are totally independent of the route.

Figure 2:
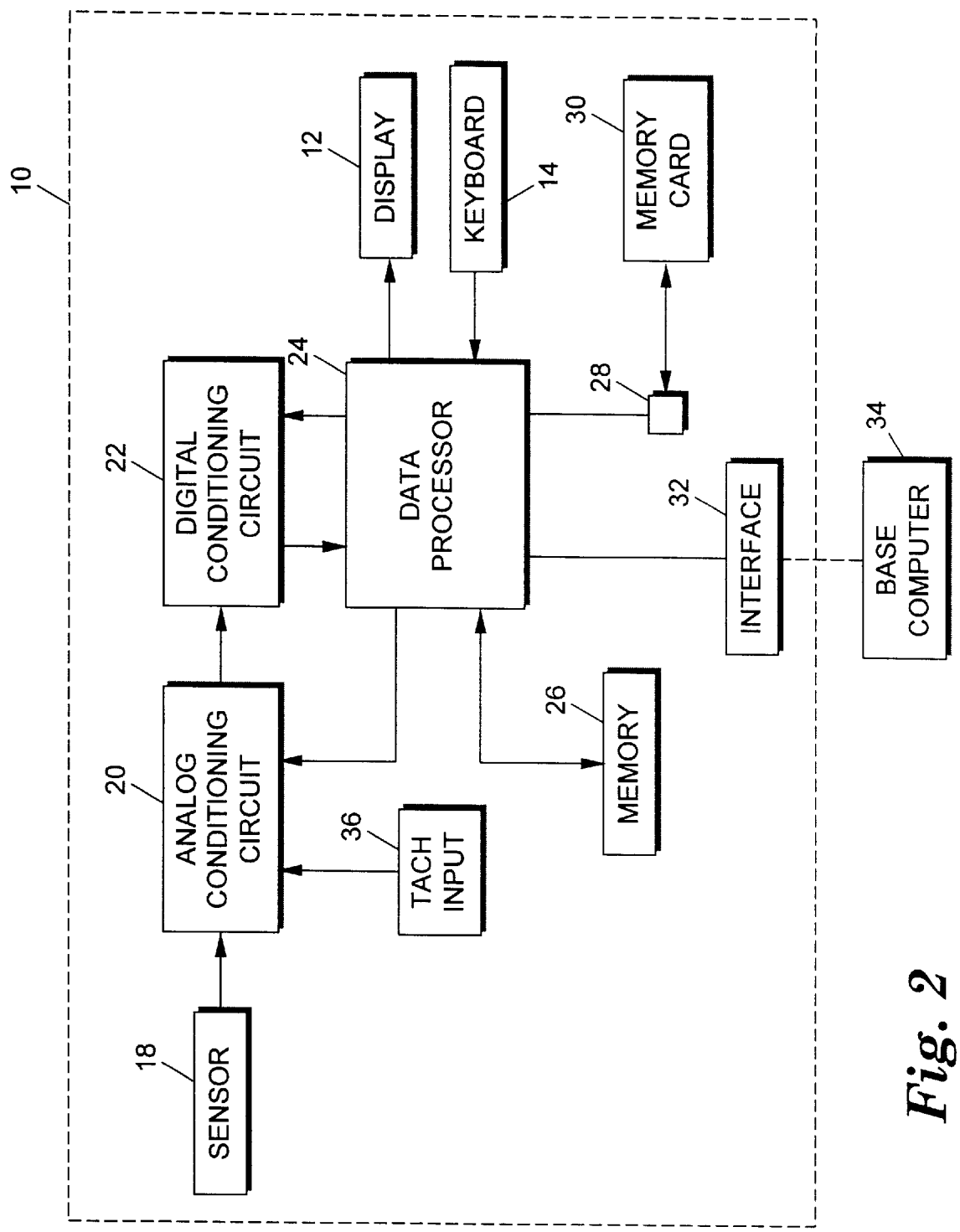
FIG. 2 is functional block diagram of the machine testing device according to a preferred embodiment of the invention.

Shown in FIG. 2 is a simplified block diagram of the analyzer 10. The analyzer 10 includes a sensor 18, such as an acceleration, velocity, or displacement transducer. The sensor 18 produces an analog signal, such as a vibration signal, that is provided to an analog conditioning circuit 20. Preferably, the analog conditioning circuit 20 performs input control, analog filtration, analog integration, amplification, and DC offset functions to produce a conditioned analog signal. The conditioned analog signal is provided to a digital conditioning circuit 22. In the preferred embodiment of the invention, the digital conditioning circuit 22 Sigma-Delta modulates and noise shapes the conditioned analog signal, converts the analog signal into to a digital signal, and digitally filters and digitally decimates the digital signal to produce a conditioned digital signal. The conditioned digital signal is provided to a data processor 24 which processes the digital signal as described in more detail hereinafter. The data processor 24 also controls the digital conditioning circuit 22 and the analog conditioning circuit 20. Also connected to the data processor 24 are a memory device 26, the display 12, and the keyboard 14. The display 12 preferably is a luminous display, such as, but not limited to, a display manufactured by Samsung under model number 87-203-0123. In the preferred embodiment, the keyboard 14 is a membrane matrix-type keyboard. Preferably, the analyzer 10 also includes a PCMCIA connector 28 coupled to the processor 24 for receiving an external PCMCIA memory card 30.

The analyzer 10 also includes an interface 32, such as an RS-232 interface or other form of communications interface, to provide for interfacing the analyzer 10 with a base computer 34. Using the interface 32, data collected by the analyzer 10 may be downloaded to the base computer 34 for storage and further analysis. Also, test setup information for machines on the route may be uploaded from the base computer 34 to the analyzer 10 through the interface 32.

Preferably, an input for an additional sensor, such as a tachometer, is also provided as shown in FIG. 2. This additional sensor input is also referred to herein as a tachometer input 36.

In the preferred embodiment of the invention, the analyzer 10 is a hand-held data collector and analyzer such as described in U.S. Pat. No. 5,633,811, and such as manufactured by Computational Systems, Inc., of Knoxville, Tenn., under the model number 2120. However, it will be understood that other types of analyzers may be employed in accordance with the invention.

In typical operation, route information is downloaded through the interface 32 from the base computer 34 to the data processor 24 which stores the route information in system memory 26. The route information typically includes a list of machines to be tested, and a number of test points specified for each machine on the route. For each test point, set-up parameters and data storage parameters are listed. The set-up parameters include such things as the type of sensor 18 to be used, the preferred measurement units, the frequency range of interest, the type of data to be displayed, and the specific data to be stored. The set-up parameters also include other parameters associated with the measurement point, such as the identity of the machine, the identity of the measurement point, a description of the measurement point, and the date and time of the test.

Figure 3:
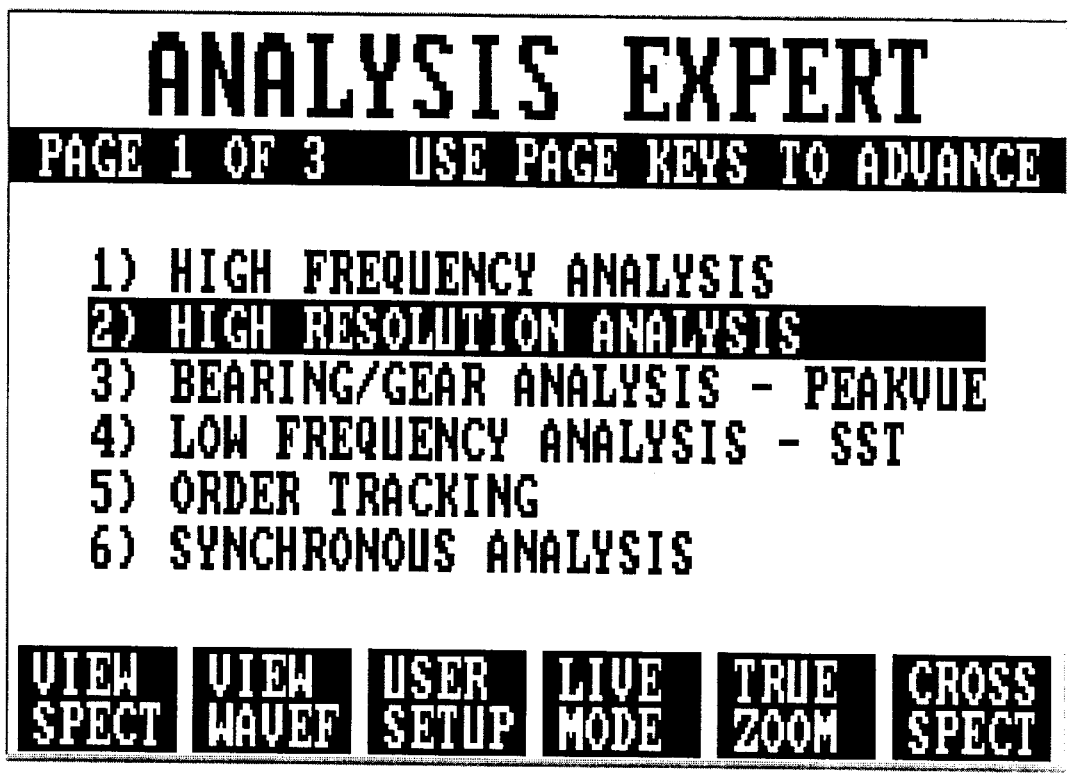
FIG. 3 depicts a display screen for selecting an expert analysis module according to a preferred embodiment of the invention.

In a typical machine testing operation, the test operator uses the analyzer 10 to collect data at a measurement point on a machine, such as at a motor bearing. The routine data collected at this motor bearing measurement point may indicate to the test operator a possible problem with the motor bearing. To further analyze the problem, the operator presses an expert activation button on the face of the analyzer 10, such as the Analyze button 38 shown in FIG. 1. (In a future analyzer to be released by Computational Systems, Inc. of Knoxville, Tenn. under Model No. 2120A, this button 38 will be labeled "Analysis Expert.") When the Analyze button 38 is pressed, the data processor 24 runs an expert selection routine that provides the operator with a list of expert modules from which the operator may choose for help in further analyzing the problem. Preferably, as shown in FIG. 3, the expert selection routine generates the list of expert modules on the display 12, and the operator may select one of the modules by scrolling through the list to highlight a desired module and pressing an ENTER key 40 on the keyboard 14.

In the preferred embodiment of the invention, the analyzer 10 includes the expert modules listed in Table I. Preferably, these expert modules are an integral part of the firmware stored in the memory 26 of the analyzer 10 when the analyzer 10 is manufactured. Additionally, it is anticipated that the analyzer 10 may be updated with newly-developed expert modules by uploading the new modules through the interface port 32.

TABLE I

| Expert Module | Description |
| --- | --- |
| High Frequency Analysis | Used to investigate higher vibrational frequencies which appear to the right hand side of the vibration spectrum or beyond. Useful when problems may be suspected beyond the maximum frequency ($F_{max}$) of the routine route data collected. This expert module is useful when data in the high frequencies of the route spectrum begin to appear as if they are on a rising slope beyond $F_{max}$ or if the HDF parameter or the overall analog vibration reading is in alarm. |
| High Resolution Analysis | Used to increase the resolution in the spectral data to aid in viewing closely-spaced spectral peaks. |
| Bearing/ Gear Peak Vue Analysis | Used when gearing or anti-friction bearing problems are suspected. This expert can also be used in slow speed applications. Is typically used with a high-frequency vibration sensor (10000–15000 Hz upper frequency limit) which is placed in the radial (horizontal) or axial position in the load zone of the suspect bearing. |
| Low Frequency Analysis | Used to observe very low turning speed and/or rolling element bearing frequencies - usually below 10 Hz. Incorporates Slow Speed Technology (SST) as described in U.S. Pat. No. 5,646,350 to enhance the low frequency data by correcting for aspects of the analog integration. The sensor may be at the same point as routine route measurement, but for very low frequency measurements, a special low-frequency accelerometer yields better low frequency amplitude results. Often this test is performed on shafts turning at less than 600 RPM (10 Hz). |
| Order Tracking | Used when there is difficulty properly identifying machine vibration frequencies because the machine speed is changing during data collection which causes the data to be "smeared" between adjacent frequency bands. This expert uses a reference (tachometer) pulse supplied to the tachometer input 36. |
| Synchronous Time Averaging | Used when the amount of non-synchronous energy (background vibration) obscures the synchronous frequency analysis, or when transmitted vibration from other machines is high. This expert also uses a reference pulse at the tachometer input 36. |
| Bump Test With Machine Running | Used when machine cannot be turned off, but resonance is still suspected and needs to be tested for. Also used to collect data on one machine whose data may be influenced by other equipment running nearby, and then shut down the machine to which the sensor is attached and let the analyzer remove the contribution of the other nearby equipment. |
| Bump Test with Machine Off | Used when high vibration levels are unexplained. May be broad or discrete in nature. A rubber tipped hammer may be used used to impact the machine near the sensor attachment point, and in the same direction as the sensor. For best results with this type of test, the machine in question should be shut off. This is because the operational vibration amplitudes are usually higher in amplitude than the vibration caused by impacting the machine with rubber tipped hammer. |

TABLE I-continued

| Expert Module | Description |
| --- | --- |
| Coastdown (Peak Hold) | Used to check for resonance during the machine coast down. Sensor is left in place and equipment is turned off immediately after data collection begins. If a resonant frequency is suspected in the route spectrum, then the frequency of the suspected resonance can be marked and this frequency used to generate the $F_{max}$ in the displayed spectrum. |
| Peak Phase Coastdown | This expert may also be used to confirm resonance. This test requires a tachometer pulse at the tachometer input 36 whose source is the shaft turning speed. The goal is to have the operational vibration excite the resonance frequencies in the system as the equipment coasts to a stop. The expert will provide the integer multiple of the turning speed frequency to be monitored during the coast down. |
| Turning Speed Detection | Used to confirm a shaft turning speed frequency. The expert collects a spectrum and detects the largest peak closest to the frequency that the operator enters as the suspected turning speed. This test can also be invoked intelligently by the analyzer if the equipment to be monitored has been defined as a variable speed machine. |
| Rotor Bar Test (Current) | Used when rotor bar defects are suspected. A current clamp is placed around one wire of the three phase power supplied to the machine under test. A current signal from the current clamp is provided as an input to the analyzer 10. |
| Cross-Channel Amplitude/ Phase | Used to determine the phase shift between two sensor locations at a particular frequency. This expert may be used to confirm misalignment, imbalance, soft foot, and resonance. This expert requires that accelerometers be placed at each measurement location. If testing for imbalance or resonance, one sensor is placed in the vertical direction and the other in the horizontal direction at the bearing location. If testing for misalignment, the sensors are placed in the same orientation (direction) on either side of the coupling. |
| Orbit Plot | Used to plot movement of a shaft centerline for orbit analysis. Two sensors are mounted 90 degrees apart at a bearing location in the radial direction. This expert particularly useful with sleeve bearings and displacement probes, but it can also be used with accelerometers. A large diameter circle can mean imbalance, a sharp oval can mean resonance, and a stationary circle within a circle can mean misalignment. |

If the operator needs help in deciding which expert module should be used to further analyze a problem, the operator may select a "help" routine associated with the expert selection routine. In the preferred embodiment of the invention, the help routine provides suggestions for the appropriate expert module to use based on the particular situation, such listed in Table II.

TABLE II

| Situation | Suggested Expert Module(s) |
| --- | --- |
| Unknown sub-synchronous data | High Resolution Analysis |
| | Low Frequency Analysis |
| Synchronous data confirmation: unbalance, misalignment, looseness | Synchronous Time Averaging |
| | High Resolution Analysis (2 × TS peak marked) |
| Confirming imbalance vs. resonance | Bump Test (Machine Running) |
| | Bump Test (Machine Off) |
| | High Resolution Analysis (1 × TS peak marked) |
| Non-synchronous vibration | High Frequency Analysis |
| | Synchronous Time Averaging |
| High frequency | High Frequency Analysis |
| Resonance suspected | Bump Test (Machine Running) |
| | Bump Test (Machine Off) |
| | Coastdown (Peak Hold) |
| | Peak/Phase Coastdown |

TABLE II-continued

| Situation | Suggested Expert Module(s) |
|---|---|
| Resonance suspected - large machine to be shut down | Peak Hold Coastdown - if no tachometer signal available Peak/Phase Coastdown- if tachometer signal available |
| Electrical | High Resolution Analysis (2 × TS peak marked) High Resolution Analysis (1 × TS peak marked) Rotor Bar Test |
| Rolling element bearing failure | Bearing/Gear PeakVue Analysis High Frequency Analysis |
| Machine speed varying during data collection | Order Tracking |
| Unsure of turning speed | Turning Speed Detection |
| Gear problems suspected | Bearing/Gear PeakVue Analysis High Resolution Analysis |

When the operator has selected one of the expert modules, such as the Bearing/Gear Analysis expert, the selected expert is executed by the processor 24. When executed, the selected expert module determines setup parameters for use in setting up the analyzer 10 to collect data, in this example for bearing fault detection data. Thus, the expert modules make intelligent decisions for the operator as to what values of the setup parameters to use in setting up the analyzer 10 to collect data for further analysis of a suspected problem. Since, the operator need not make decisions about the selection of the setup parameters, the operator need not be highly skilled in machine testing techniques. The operator need only be able to follow the instructions and suggestions provided by the analyzer 10.

Table III provides a summary of the setup parameters that are determined by the expert modules.

TABLE III

| Parameter Name | Description | Default Value* |
|---|---|---|
| Frequency | The maximum frequency in HZ of the spectrum to be collected; also referred to as $F_{max}$. | no default |
| Low Cutoff | The minimum frequency in HZ of the spectrum to be displayed; also referred to as $F_{min}$. | 0.0 |
| Lines | The number of lines of resolution to be used in the spectral data collection. | no default |
| Window | A multiplying factor used to shape the waveform data. | Hanning |
| Averages | The number of samples or blocks of the data to be collected. | 4 |
| Init Setup | Allows the data collection to reproduce the route point settings. | no |
| Integ Mode | Determines whether or not the data is integrated digitally in the spectrum or analog in the waveform. | digital |
| Units | The display units of the spectrum; can also imply the units of the waveform if analog integration was selected. | no default |
| Averaging Mode | The method used to average together all of the samples specified by the Averages parameter. | normal |
| Trig Mode | The event that must occur for data to be collected. | off |
| Trig Level | The amplitude of the trigger event. | 0.0 |
| % Pre-trig | The amount of time data to be included in the sample BEFORE the trigger event occurred. | 0.0 |
| Fixed Scale Range | The maximum amplitude range of the analyzer. | 0.0 (auto) |
| SST | Controls the usage for the Slow Speed Technology correction factor. | off |
| A-Weighting | Adjusts the ⅓ octave airborne noise data to reflect how this data would be heard by the human ear. | off |
| Triax Control | Allows for use of a sensor that can measure three vibrational axis simultaneously. | off |

TABLE III-continued

| Parameter Name | Description | Default Value* |
|---|---|---|
| Demodulation | Enables the demodulation method of high frequency analysis to be used. | off |
| PeakVue | Enables the PeakVue technology to be used. | off |
| Prefilter | Allows for selection of the appropriate high pass filter value to be used in demodulation and PeakVue functions. | none |
| Order | Multiple of turning speed to be monitored. | 1 |
| Bandwidth (BW) | The range of frequencies to be measured. This range will have the Order frequency in the center of the range. A value of 0.1 for the bandwidth means a 10% range (+5% and −5% around the Order value. For example, if the Order value is 1 and the turning speed is 30 Hz, then the bandwidth will be from 27 Hz to 33 Hz for a bandwidth of 0.1. | 0.1 |
| Averager Enabled | If set to yes, all of the data samples are averaged together. If set to no, the data will be displayed as unaveraged monitored data. | no |
| Minimum RPM | If the turning speed drops below this threshold, then the data collection will stop. | 0 |
| Tach Time Out | Setting to yes disables a tach time-out message. This means that data collection may continue even if the tachometer signal is disrupted during a test. | yes |

*Values indicated are default values common to all expert modules.

Tables IV, V, VI, and VII below indicate the values of the analyzer setup parameters for the High Resolution, Bearing/Gear PeakVue, Bump Test (Machine Off), and Peak Phase Coastdown expert analysis modules, respectively. The three right-most columns of these tables indicate the values of the setup parameters for three situations in which the expert modules may be used. In one situation, the operator may have just performed a routine test at a particular test point of a machine on a route, collected route data at the measurement point, and sees something in the route data indicative of a problem with the machine. At that point, the operator may activate an expert module to gather more information about the nature of the problem. In this situation, since route data has been collected, the selected expert module automatically sets up the analyzer 10 using the values listed in one of the two "Route Data" columns: "Route Data, No Marked Frequency" or "Route Data, Marked Frequency".

When an operator has collected vibration data at a measurement point along a route, and is viewing the FFT vibration spectrum on the display 12 of the analyzer 10, there may be a particular frequency, or range of frequencies, at which the operator wishes to focus the analysis. For example, there may be a peak in the vibration spectrum that the operator would like to view at a higher resolution. In that situation, the operator may mark the frequency of the peak using a frequency marking function of the analyzer 10. In the preferred embodiment of the invention, the keyboard 14 of the analyzer 10 includes left and right arrow keys 42 (FIG. 1) which, when pressed, move a cursor on the display 12 from one frequency to the next in the displayed spectrum. Using the arrow keys 42, the operator may place the cursor on or near a peak of interest in the frequency spectrum. Then, by pressing a MARK key 44 on the keyboard 14, the operator marks or designates the frequency corresponding to the position of the cursor. The marked frequency is also referred to herein as $F_{MARK}$.

If a frequency in the spectrum has been marked, the selected expert module automatically sets up the analyzer 10 using the values listed in the "Marked Frequency" column. If a frequency in the spectrum has not been marked, the selected expert module automatically sets up the analyzer 10 using the values listed in the "Route Point, No Marked Frequency" column.

In another situation, the operator may wish to use one of the expert modules to perform a test without having first loaded a route measurement point for the data to be collected at a particular measurement point. Such a test may be referred to as an "off route" test. In this situation, since no route measurement point exists, the selected expert module sets up the analyzer 10 using the values listed in the "No Route Point" column.

Thus, using the expert modules, the operator need not manually set any of the test setup parameters. The expert modules do this automatically based on the particular situation.

TABLE IV

High Resolution Expert Parameters

| Parameter Name | Value If No Route Point | Value If Route Point; No Marked Frequency | Marked Frequency |
|---|---|---|---|
| Frequency | 1600 Hz | Route $F_{MAX}$ | See FIG. 5. |
| Low Cutoff | 0.0 | 0.0 | 0.0 |
| Lines | 6400 | 4 × Route Lines | See FIG. 5. |
| Window | Hanning | Hanning | Hanning |
| Averages | 4 | 4 | 4 |
| Init Setup | No | No | No |
| Integ Mode | Digital | Route Setting | Route Setting |
| Units | Velocity | Route Setting | Route Setting |
| Averaging Mode | Normal | Normal | Normal |
| Trig Mode | Off | Off | Off |
| Trig Level | 0.0 | 0.0 | 0.0 |
| % Pre-trig | 0 | 0 | 0 |
| Fixed Scale Range | 0.0 | 0.0 | 0.0 |
| SST | No | No | No |
| A-Weighting | No | No | No |
| Triax Control | Off | Off | Off |
| Demodulation | No | No | No |
| PeakVue | No | No | No |
| Prefilter | Off | Off | Off |

TABLE V

Bearing/Gear PeakVue Expert Parameters

| Parameter Name | Value If No Route Point | Value If Route Point; No Marked Frequency | Marked Frequency |
|---|---|---|---|
| Frequency | 1000 Hz | 1000 Hz | > or equal to $F_{MARK}$ |
| Low Cutoff | 0.0 | 0.0 | 0.0 |
| Lines | 1600 | 1600 | $\frac{F_{MAX}}{1HZ}$ |
| Window | Hanning | Hanning | Hanning |
| Averages | 4 | 4 | 4 |
| Init Setup | No | No | No |
| Integ Mode | Digital | Digital | Digital |
| Units | Acceleration | Acceleration | Acceleration |
| Averaging Mode | Normal | Normal | Normal |
| Trig Mode | Off | Off | Off |
| Trig Level | 0.0 | 0.0 | 0.0 |
| % Pre-trig | 0 | 0 | 0 |
| Fixed Scale Range | 0.0 | 0.0 | 0.0 |
| SST | No | No | No |
| A-Weighting | No | No | No |
| Triax Control | Off | Off | Off |
| Demodulation | No | No | No |
| PeakVue | Yes | Yes | Yes |
| Prefilter | 1000 HZ high-pass | 1000 HZ high-pass | $\geq F_{MAX}$ |

TABLE VI

Bump Test (Machine Off) Expert Parameters

| Parameter Name | Value If No Route Point | Value If Route Point; No Marked Frequency | Marked Frequency |
|---|---|---|---|
| Frequency | 400 Hz | Route $F_{MAX}$ | 2.5 × $F_{MARK}$ |
| Low Cutoff | 0.0 | 0.0 | 0.0 |
| Lines | 400 | $\frac{F_{MAX}}{1HZ}$ | $\frac{F_{MAX}}{1HZ}$ |
| Window | Uniform | Uniform | Uniform |
| Averages | 6 | 6 | 6 |
| Init Setup | No | No | No |
| Integ Mode | Digital | Digital | Digital |
| Units | Acceleration | Acceleration | Acceleration |
| Averaging Mode | Normal | Normal | Normal |
| Trig Mode | Pre-trigger | Pre-trigger | Pre-trigger |
| Trig Level | 0.5 | 0.5 | 0.5 |
| % Pre-trig | 10 | 10 | 10 |
| Fixed Scale Range | Full Scale | Full Scale | Full Scale |
| SST | No | No | No |
| A-Weighting | No | No | No |
| Triax Control | Off | Off | Off |
| Demodulation | No | No | No |
| PeakVue | No | No | No |
| Prefilter | Off | Off | Off |

TABLE VII

Peak Phase Coastdown Expert Parameters

| Parameter Name | Value If No Route Point | Value If Route Point; No Marked Frequency | Marked Frequency |
|---|---|---|---|
| Order | 1 | 1 | Next highest RPM multiple above $F_{MARK}$ |
| Bandwidth | 0.1 | 0.1 | 0.1 |
| Averager enabled | No | No | No |
| Minimum RPM | 0 | 0 | 0 |
| Tach Time Out | Yes | Yes | Yes |
| Full Scale Range | 50 | 50 | 50 |
| Integ Mode | Digital | Digital | Digital |
| Units | Sensor | Route Units | Route Units |

High Resolution Expert

The High Resolution expert is used to increase the resolution, or number of lines, in the spectral data that is displayed in the display 12. The test operator may use this expert when a routine route test has just been performed and the operator sees something in the spectral data from the test that causes him to want to examine a portion of the frequency spectrum in more detail.

Figures 4A, 4B:
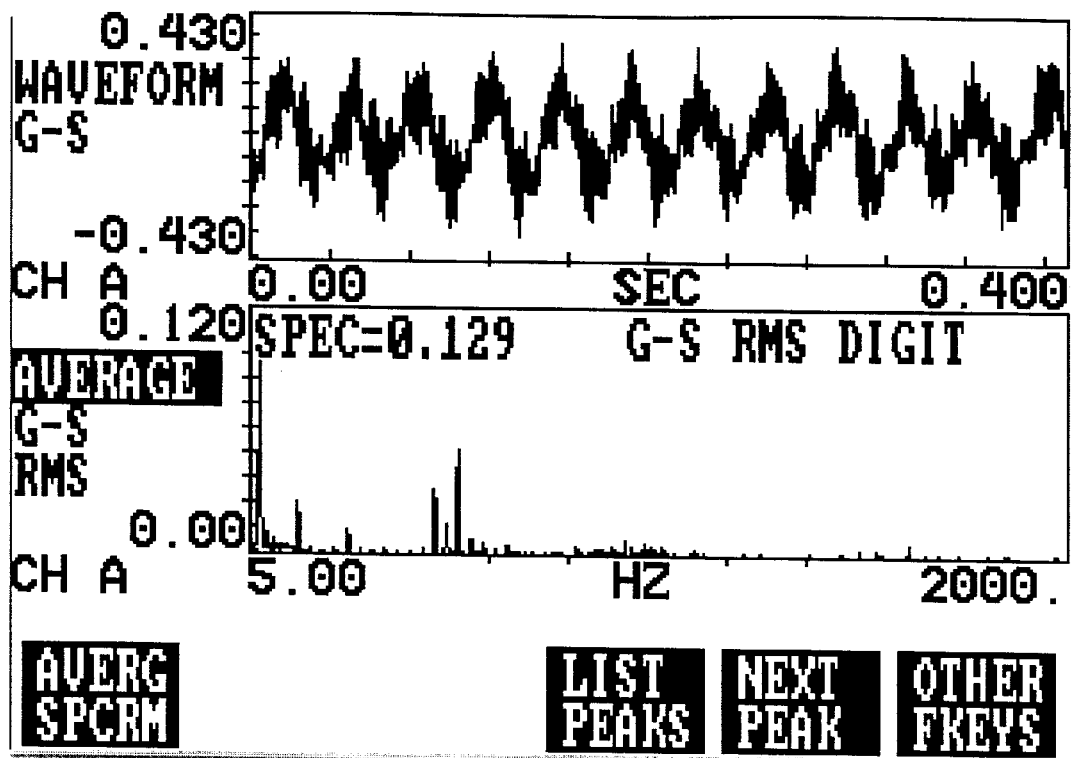
FIG. 4A depicts a display screen showing vibration test data according to a preferred embodiment of the invention.
FIG. 4B depicts a display screen showing test setup parameters according to a preferred embodiment of the invention.

FIG. 4A depicts an example of how the test data from the routine route test appears on the display 12. The upper portion of the display 12 shows a time-domain waveform of the just-collected data. Note that the scale of the time-domain data is from 0 to 400 milliseconds. The lower portion of the display 12 shows the frequency spectrum produced by an FFT of the time-domain data. Note that $F_{MIN}$ is 5 HZ and $F_{MAX}$ is 2000 HZ in the example of FIG. 4A.

FIG. 4B depicts a screen as it may appear on the display 12 indicating some of the setup parameters that were used in collecting the data shown in FIG. 4A. Note that the Lines parameter was set to 800 when the spectral data of FIG. 4A was collected. Thus, the frequency resolution of the spectral route data shown in FIG. 4A is 2000 HZ÷800 lines=2.5 HZ/line. This frequency resolution is also referred to herein as xRes.

Figure 5:
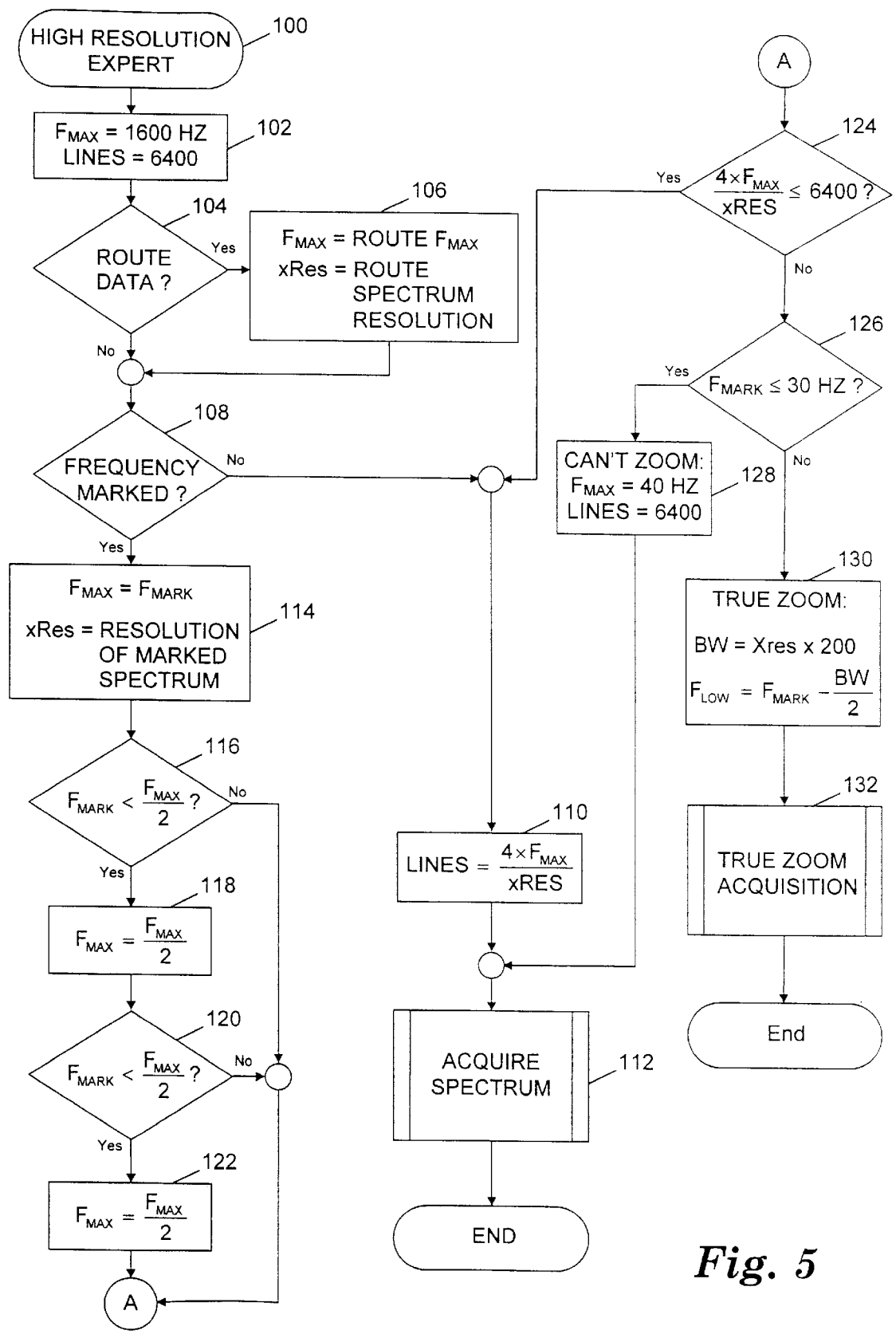
FIG. 5 is a flow diagram depicting the operation of a High Resolution expert analysis module according to a preferred embodiment of the invention.

Referring now to the flowchart of FIG. 5, the function of the High Resolution expert according to a preferred embodiment of the invention is explained. When the operator has selected the High Resolution expert from the selection screen (FIG. 3) and pressed the ENTER button 40 on the analyzer 10 (FIG. 1), the processor 24 begins execution of the High Resolution expert analysis module (step 100). First, $F_{MAX}$ is set to 1600 HZ and Lines is set to 6400 (step 102). The expert module then determines whether a route measurement point exists (step 104). If so, $F_{MAX}$ is set to be equivalent to the $F_{MAX}$ that was used in the route setup information, and xRes is set to be equivalent to the resolution of the route spectral data as specified by the route measurement point setup information(step 106). In this example, $F_{MAX}$ is 2000 HZ and xRes is 2.5 HZ. Processing then continues at step 108.

If a route measurement point exists (step 104), the values of Lines and $F_{MAX}$ remain unchanged, and processing continues at step 108.

With continued reference to FIG. 5, the expert module next determines whether a frequency in the displayed spectrum has been marked (step 108). If not, Lines is set according to:

$$\text{Lines} = \frac{4 \times F_{MAX}}{xRes} \quad \text{(step 110)}. \tag{1}$$

For the current example where no frequency has been marked, Lines is determined according to:

$$\text{Lines} = \frac{4 \times 2000 \text{ HZ}}{2.5 \text{ HZ}} = 3200.$$

Figures 6A, 6B:
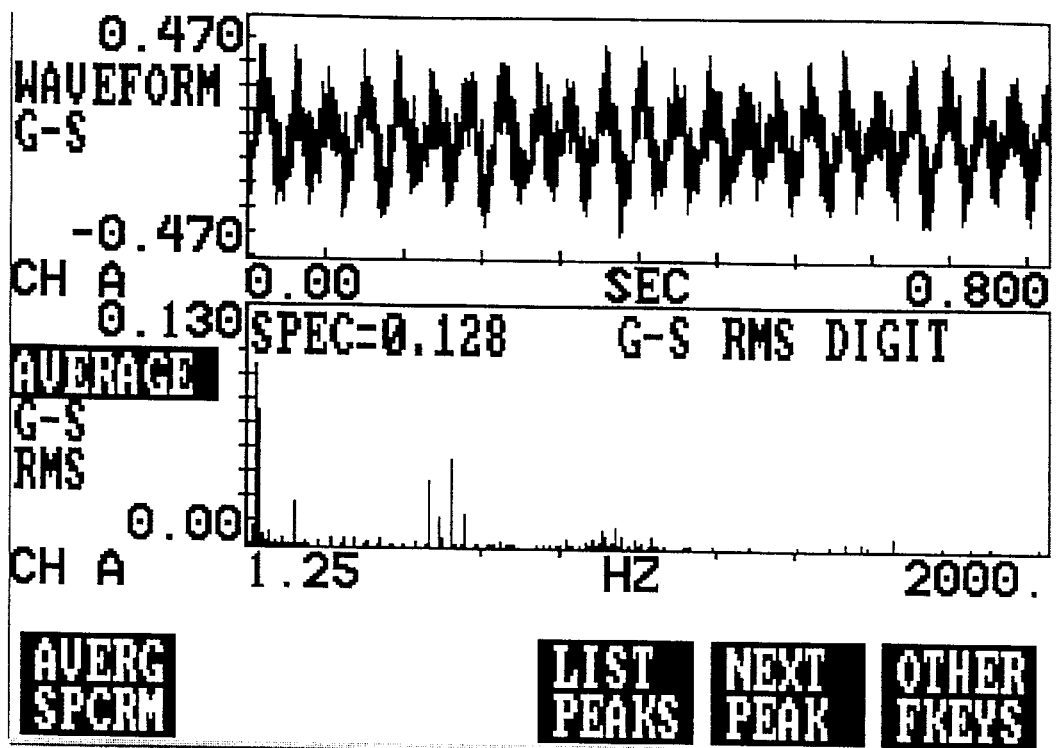
FIG. 6A depicts a display screen showing vibration test data according to a preferred embodiment of the invention.
FIG. 6B depicts a display screen showing test setup parameters according to a preferred embodiment of the invention.

The expert analysis module then causes the analyzer 10 to acquire a new set of frequency spectral data (step 112) with $F_{MAX}$ set to 2000 HZ and Lines set to 3200. It will be appreciated that the phrase "frequency spectral data" refers to a series of data points, each consisting of an amplitude value, such as a vibration or acceleration amplitude value, associated with a frequency value. The new set of spectral data collected by the expert module is shown in the display screen of FIG. 6A, and a portion of the setup parameters used by the expert module in collecting the data are depicted in the display screen of FIG. 6B. Note that in order to increase the spectral resolution, the parameters set up by the expert module caused the analyzer 10 to collect data over a 0.8 second time period, where in the route test the time period was 0.4 seconds. Note also that Lines is set to 3200 in FIG. 6B.

If a frequency in the displayed spectrum is marked (step 108), $F_{MAX}$ is set equal to $F_{MARK}$, and xRes is set equal to the frequency resolution of the marked spectrum (step 114). If $F_{MARK}$ is less than half of $F_{MAX}$ (step 116), $F_{MAX}$ is halved (step 118). If $F_{MARK}$ is still less than half of $F_{MAX}$ (step 120), $F_{MAX}$ is halved again (step 122), and processing continues at step 124. If $F_{MARK}$ is not less than half of $F_{MAX}$ at step 116 or step 120, processing continues at step 124.

If four times $F_{MAX}$ divided by xRes is less than or equal to 6400 (step 124), then processing continues with steps 110 and 112 as described above. If four times $F_{MAX}$ divided by xRes is not less than or equal to 6400 (step 124), then the expert module determines whether $F_{MARK}$ is less than or equal to 30 HZ (step 126).

If $F_{MARK}$ is less than or equal to 30 HZ (step 126), $F_{MAX}$ is set to 40 HZ and Lines is set to 6400 (step 128), and the analyzer 10 acquires a new set of frequency spectral data (step 112). If $F_{MARK}$ is not less than or equal to 30 HZ (step 126), the measurement bandwidth, BW, is set equal to xRes times 200, and $F_{LOW}$ is set equal to $F_{MARK}$ minus half of BW (step 130). The expert analysis module then causes the analyzer 10 to acquire a new set of frequency spectral data (step 132) using "true zoom" as described in U.S. Pat. Nos. 5,633,811 and 5,691,924, the entire contents of which are incorporated herein by reference.

In general, the results provided by the High Resolution expert module allow viewing of closely spaced peaks in the spectral data. Individual peaks which appear to be merged into a single peak in the original spectrum are more clearly separated in the higher resolution spectrum. For example, trying to distinguish a two-times-turning-speed (2×TS) peak from a two-times-line-frequency (2×LF) peak can be difficult or impossible with low-resolution spectral data. However, using high-resolution spectral data collected by the High Resolution expert, two distinct peaks become visible. If the 2×LF peak is higher in amplitude than the 2×TS peak, this could indicate an electrical problem instead of a misalignment problem. Also, sideband frequencies beside the turning speed peak in an AC induction motor could indicate rotor bar problems.

Bearing/Gear PeakVue Expert

The Bearing/Gear PeakVue expert module is used when gear or anti-friction bearing problems are suspected in the machine being tested. The test operator may use this expert when a routine route test has just been performed and the operator sees something in the spectral data from the test that causes him to suspect gear or bearing problems.

The following description of the invention refers to an analyzer function called PeakVue. PeakVue refers to a signal processing methodology used in machine fault detection for finding peaks in machinery vibration signals. The PeakVue methodology is described in detail in U.S. Pat. No. 5,895,857, the entire contents of which are incorporated herein by reference.

Figure 7:
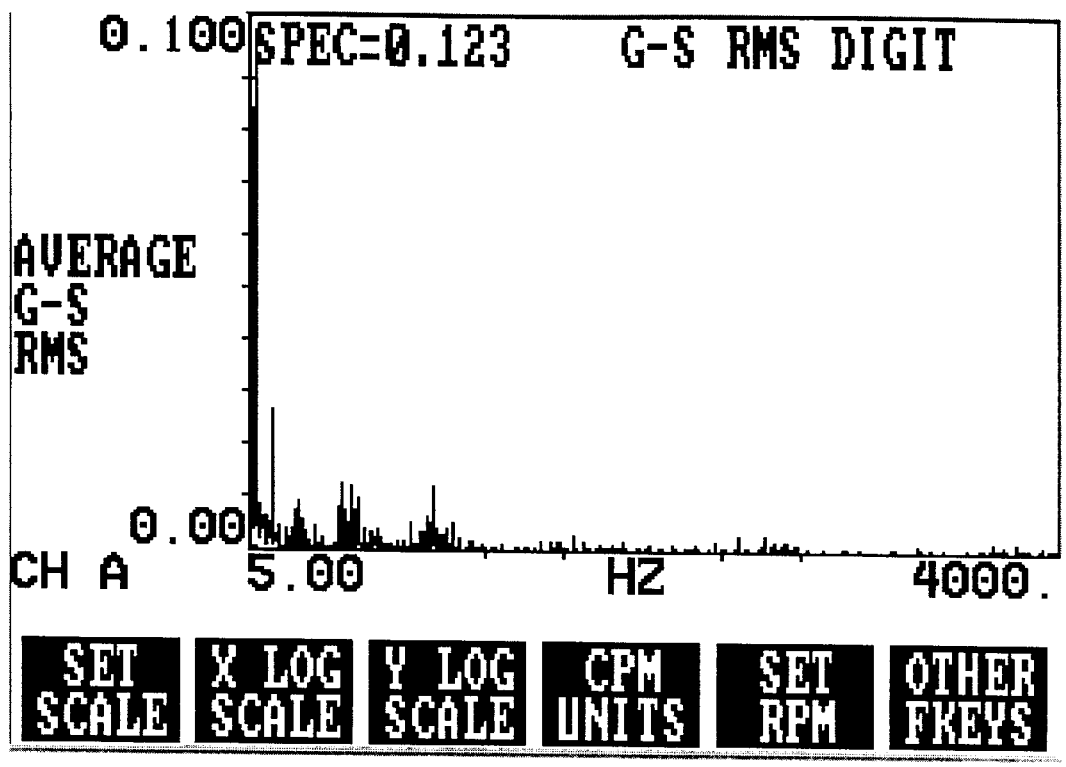
FIG. 7 depicts a display screen showing vibration spectral data according to a preferred embodiment of the invention.
Figure 8:
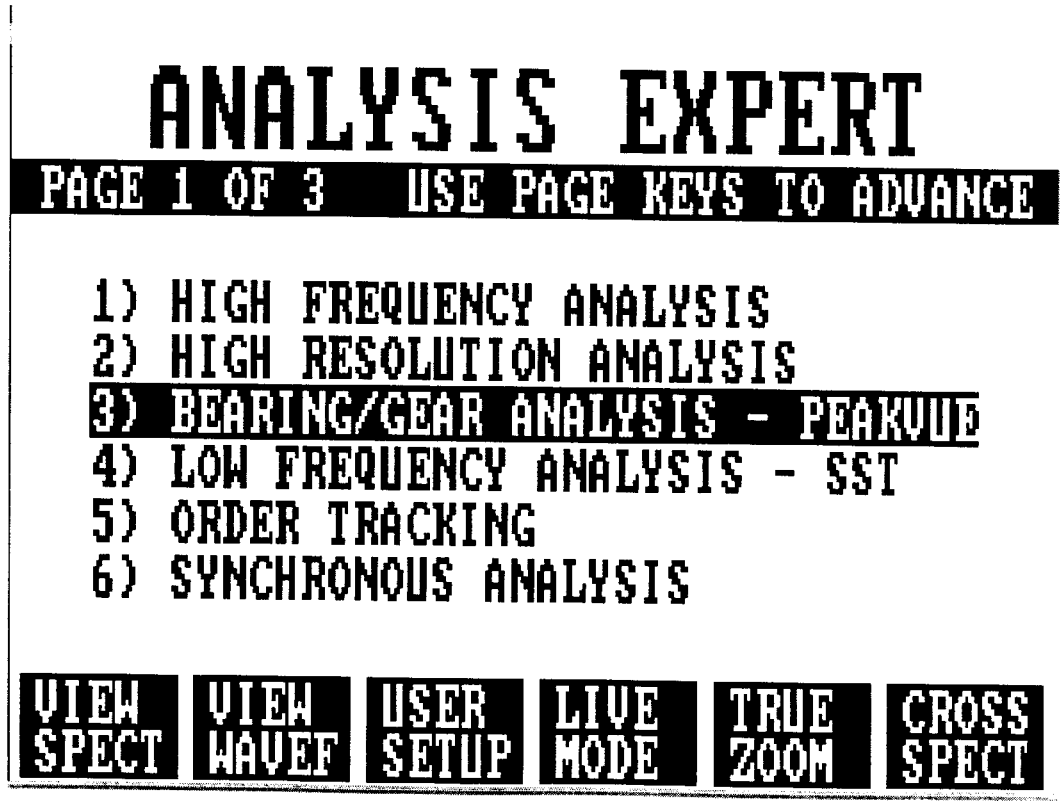
FIG. 8 depicts a display screen for selecting an expert analysis module according to a preferred embodiment of the invention.

FIG. 7 depicts an example of how test data from a routine route test appears on the display 12. The "Route Values" column of Table VIII lists the setup parameters that were used by the analyzer 10 in collecting the data shown in FIG. 7. If the test operator sees something in the data of FIG. 7 that makes him want to further investigate possible gear or bearing problems, he presses the Analyze button 38 on the face of the analyzer 10. The display 12 of the analyzer 10 then preferably displays the screen shown in FIG. 8. The operator then selects the third analysis expert in the list shown in FIG. 8 and presses the Enter button 40.

TABLE VIII

Example of Bearing/Gear PeakVue Expert Parameters

| Parameter Name | Route Point Value | Value If Route Point; No Marked Frequency | Marked Frequency |
|---|---|---|---|
| Frequency | 4000 Hz | 1000 Hz | 2000 Hz |
| Low Cutoff | 0.0 | 0.0 | 0.0 |
| Lines | 1600 | 1600 | 3200 |
| Window | Hanning | Hanning | Hanning |
| Averages | 4 | 4 | 4 |
| Init Setup | No | No | No |
| Integ Mode | Digital | Digital | Digital |
| Units | Acceleration | Acceleration | Acceleration |
| Averaging Mode | Normal | Normal | Normal |
| Trig Mode | Off | Off | Off |
| Trig Level | 0.0 | 0.0 | 0.0 |
| % Pre-trig | 0 | 0 | 0 |
| Fixed Scale Range | 0.0 | 0.0 | 0.0 |

TABLE VIII-continued

Example of Bearing/Gear PeakVue Expert Parameters

| Parameter Name | Route Point Value | Value If Route Point; No Marked Frequency | Marked Frequency |
|---|---|---|---|
| SST | No | No | No |
| A-Weighting | No | No | No |
| Triax Control | Off | Off | Off |
| Demodulation | No | No | No |
| PeakVue | No | Yes | Yes |
| Prefilter | Off | 1000 HZ high-pass | 2000 HZ high-pass |

Figure 9:
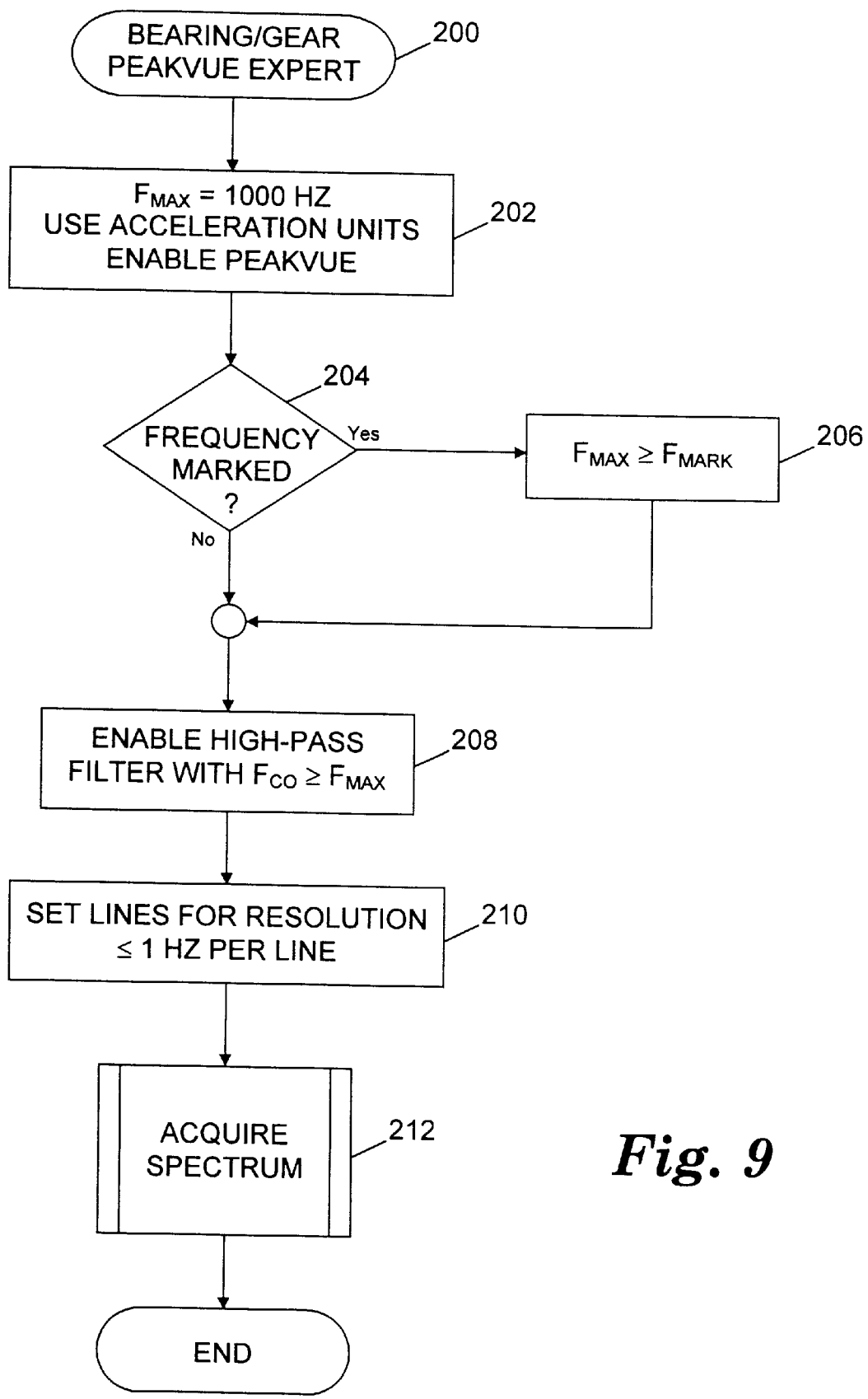
FIG. 9 is a flow diagram depicting the operation of a Bearing/Gear PeakVue expert analysis module according to a preferred embodiment of the invention.

Referring now to the flowchart of FIG. 9, the operation of the Bearing/Gear PeakVue expert according to a preferred embodiment of the invention is explained. When the operator has selected the Bearing/Gear expert and pressed the Enter button 40 on the analyzer 10, the processor 24 begins execution of the Bearing/Gear PeakVue expert module (step 200). First, $F_{MAX}$ is set to 1000 HZ, acceleration measurement units are selected, and the PeakVue function is enabled (step 202). The expert module then determines whether a frequency in the spectrum has been marked (step 204). If not, $F_{MAX}$ remains unchanged at 1000 HZ. The expert module then enables a digital high-pass prefilter and sets the cut-off frequency of the prefilter, $F_{CO}$, to be greater than or equal to $F_{MAX}$ (step 208). The Lines parameter is then selected to provide a frequency resolution of the spectral data of at least one HZ per line (step 210). For example, in the preferred embodiment, if no frequency is marked, the Lines parameter is set to 1600. The frequency spectrum data is then acquired (step 212).

Figure 10:
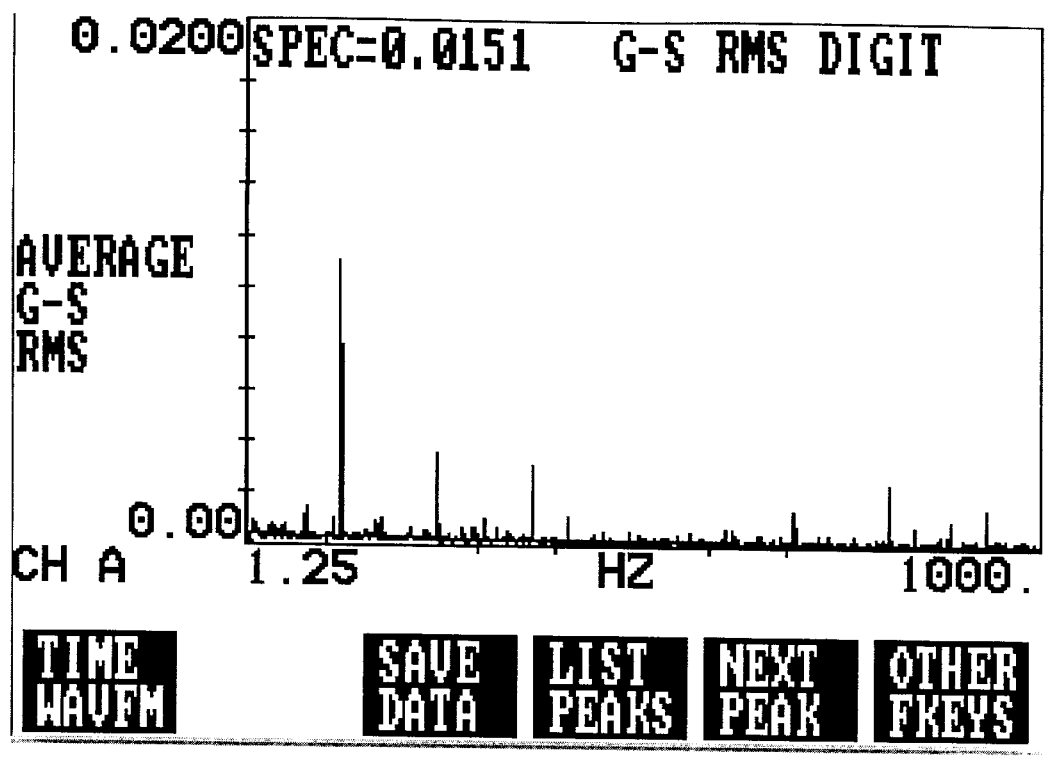
FIGS. 10, 11, and 12 depict display screens showing vibration spectral data according to a preferred embodiment of the invention.

FIG. 10 depicts the display screen showing the spectral data collected by the Bearing/Gear PeakVue expert module for the case of no marked frequency.

Figure 11:
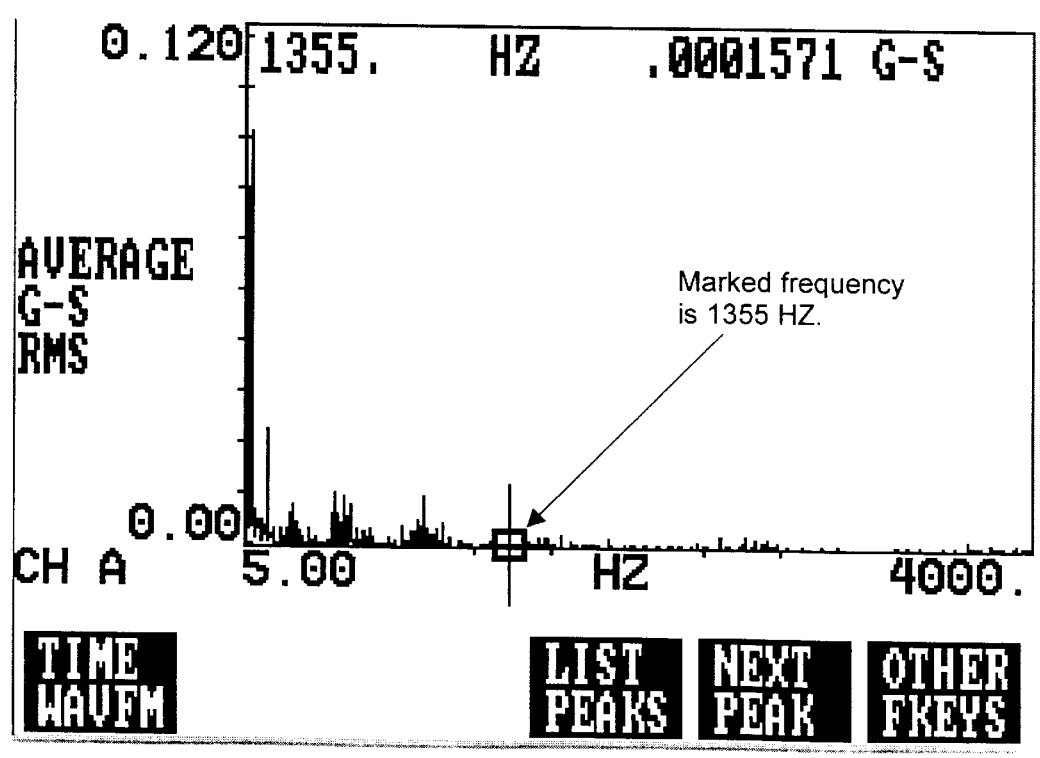

If, at step 204 of FIG. 9, the expert module determines that a frequency in the spectrum was marked, $F_{MAX}$ is set to be greater than or equal to $F_{MARK}$ (step 206). For example, as shown in the display screen depicted in FIG. 11, if the marked frequency is 1355 HZ, the expert module preferably sets $F_{MAX}$ to 2000 HZ. The digital high-pass prefilter is then enabled with a cut-off frequency, $F_{CO}$, greater than or equal to 2000 HZ (step 208). In this example, $F_{CO}$ is set at 2000 HZ. The frequency spectrum data is then acquired (step 212).

Figure 12:
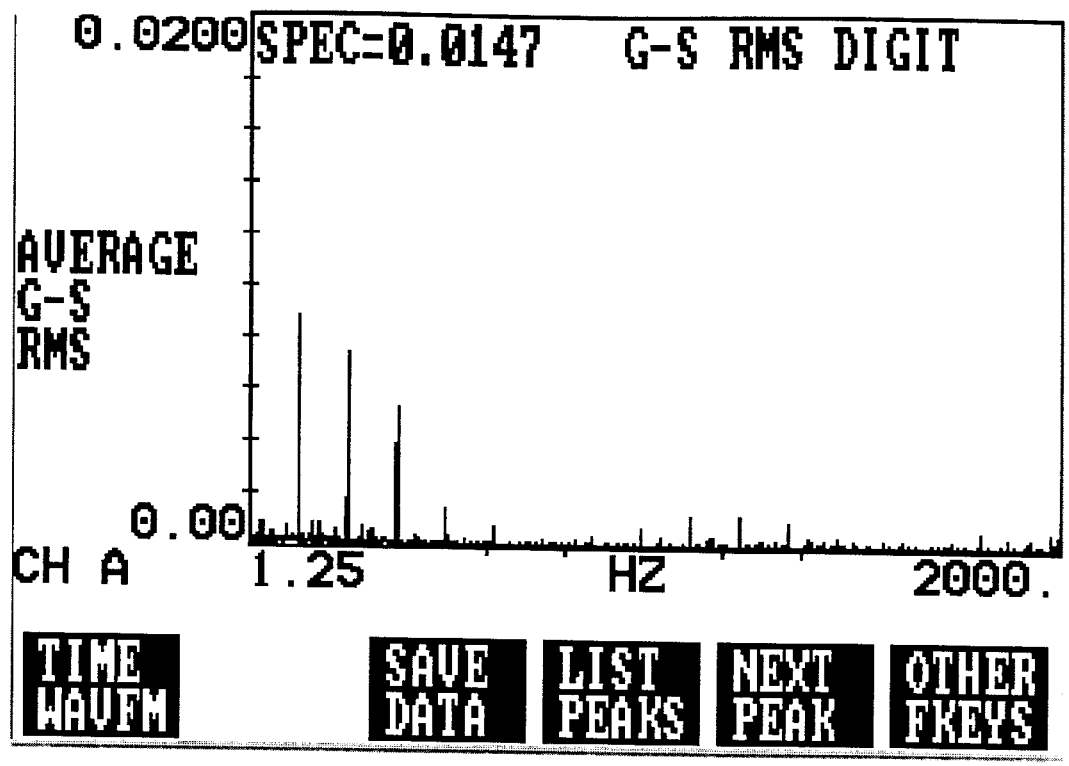

FIG. 12 depicts the display screen showing the spectral data collected by the Bearing/Gear PeakVue expert module for the case of a marked frequency of 1355 HZ.

In general, the results provided by the Bearing/Gear PeakVue expert module allow viewing of peaks in the spectral data indicative of bearing and gear defects. The bearing defect frequencies will appear at their fundamental frequencies in the spectrum. These peaks will be non-synchronous. Generally, gear defects may be identified by the defective gear's shaft turning speed frequency and harmonics thereof.

Bump Test (Equipment Off)

The Bump Test (Equipment Off) expert module is used to determine natural resonances in the machine under test. When an observed vibrational amplitude is high, this test may be used to determine whether the high vibration is caused by a high input force, or by a low input force that is increased by resonant amplification. This test is performed by applying an impact force to the machine, typically using a rubber tipped hammer. The hammer impact is preferably applied near the sensor 18, and in the same direction as the sensor 18 senses. This test is performed while the machine is off since operational vibration amplitudes are usually higher in amplitude than vibration caused by impacting the machine with the hammer.

This expert module will be described based upon the following scenario: The test operator starts from a situation where no route parameters are loaded into the analyzer. Thus, there is no prior measurement point information to draw from. The operator will perform the bump test and mark a frequency in the resulting spectral data. The operator will then repeat the test, but the second time the marked frequency will be used in determining the setup parameters to be used in the second data collection.

Figure 13:
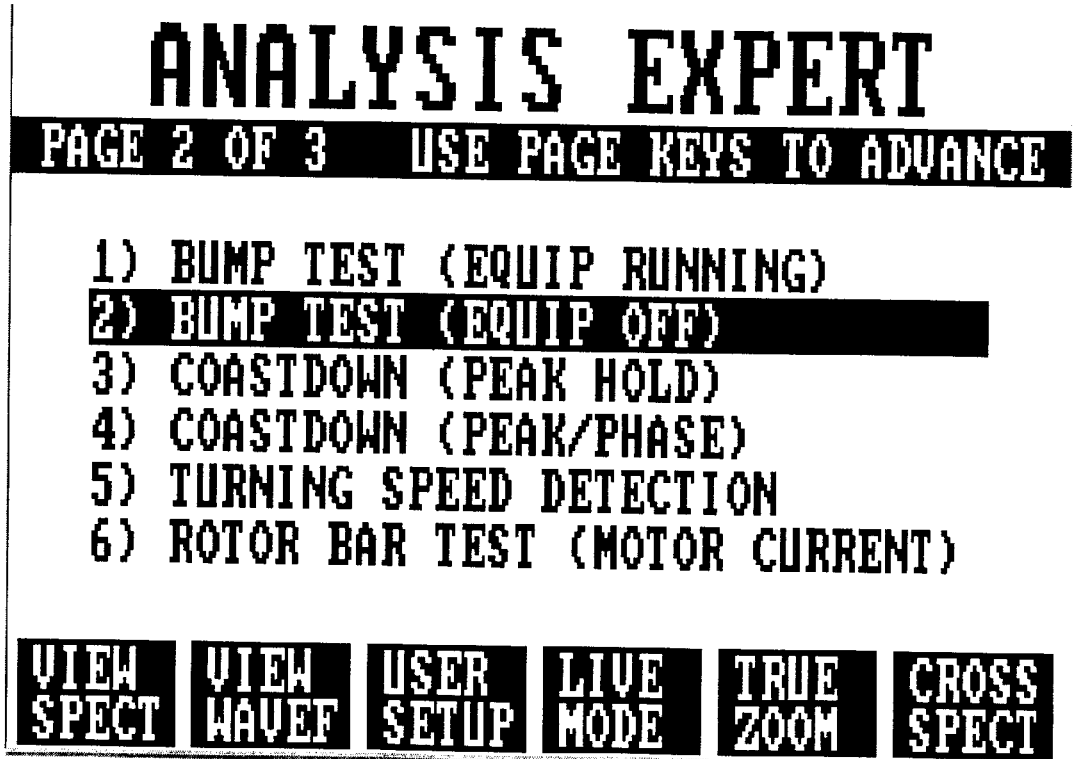
FIG. 13 depicts a display screen for selecting an expert analysis module according to a preferred embodiment of the invention.

The operator first presses the Analyze button 38 on the analyzer 10, and proceeds to the second page of the listing of available expert modules, as depicted in the screen display of FIG. 13. The operator then selects the Bump Test (Equip Off) expert and presses the Enter key 40.

Figure 14:
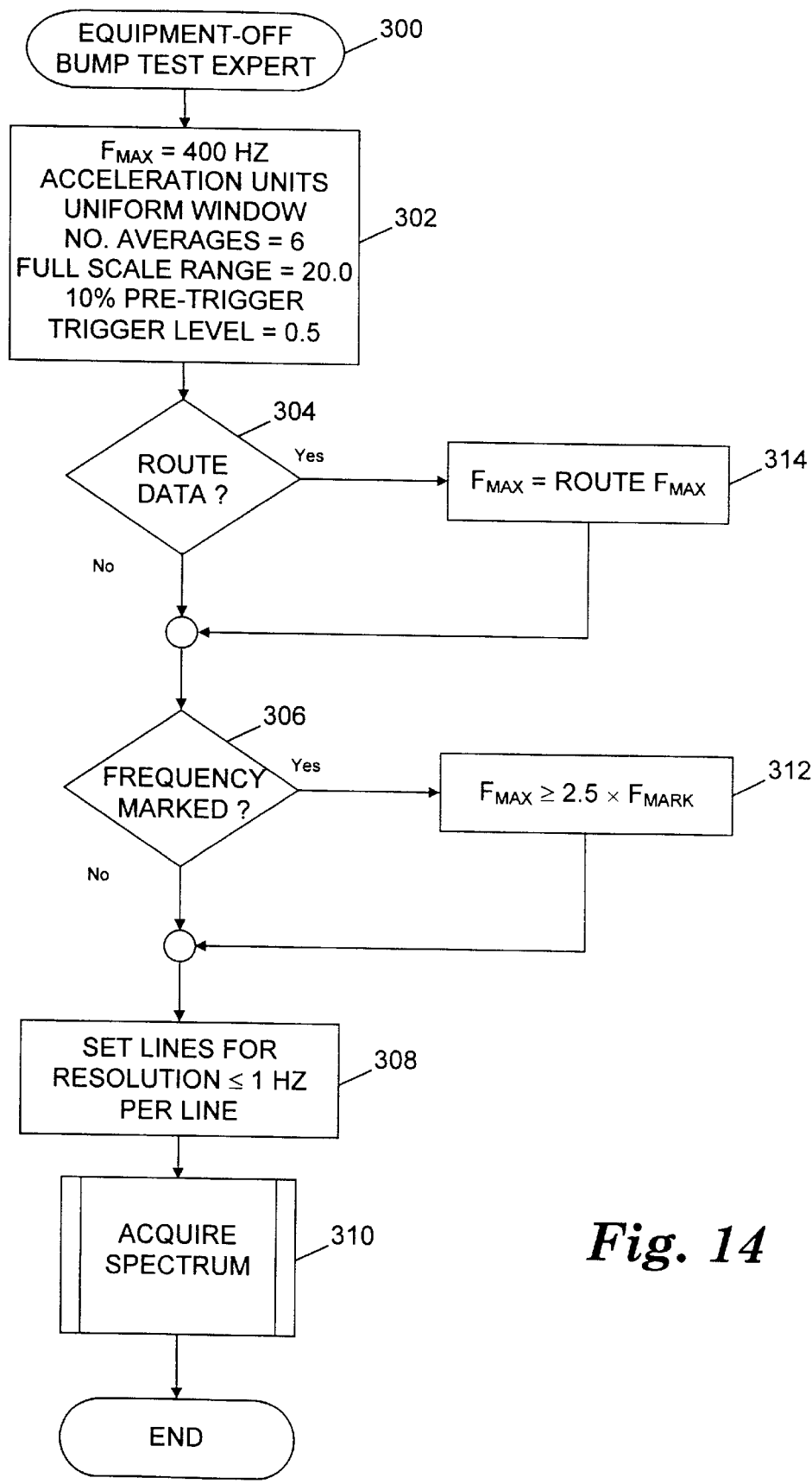
FIG. 14 is a flow diagram depicting the operation of an Equipment-Off Bump Test expert analysis module according to a preferred embodiment of the invention.

Referring now to FIG. 14, when the operator presses the Enter key 40, the processor 24 begins execution of the Bump Test (Equipment Off) expert module (step 300). In the preferred embodiment, the expert module first sets $F_{MAX}$ to 400 HZ, selects acceleration units and a uniform window, and sets Averages to 6, Full Scale Range to 20.0, Pre-Trigger to 10%, and Trigger Level to 0.5 (step 302). If there is no route data (step 304) and no marked frequency (step 306), as is the case in the present example, the expert module sets the value of Lines to provide a frequency resolution of at least one HZ per line (step 308). Thus, Lines is set to 400 for this example. The frequency spectrum data is then acquired (step 310).

Figure 15:
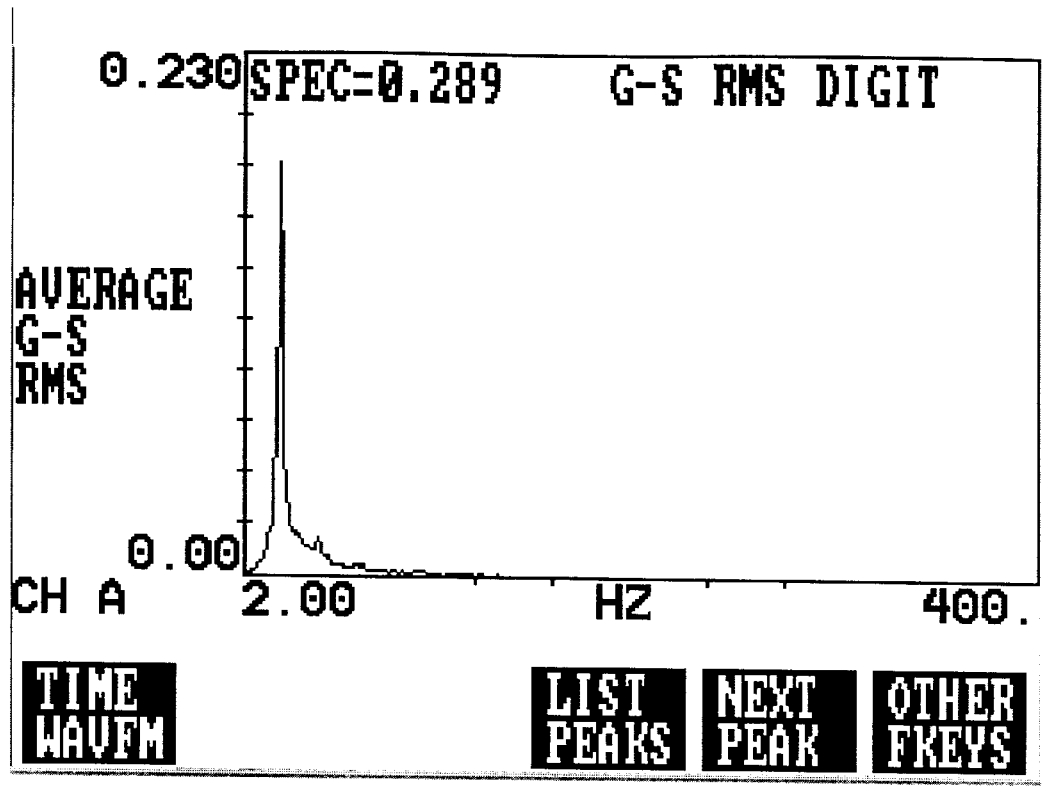
FIGS. 15, 16, and 17 depict display screens showing vibration spectral data according to a preferred embodiment of the invention.
Figure 16:
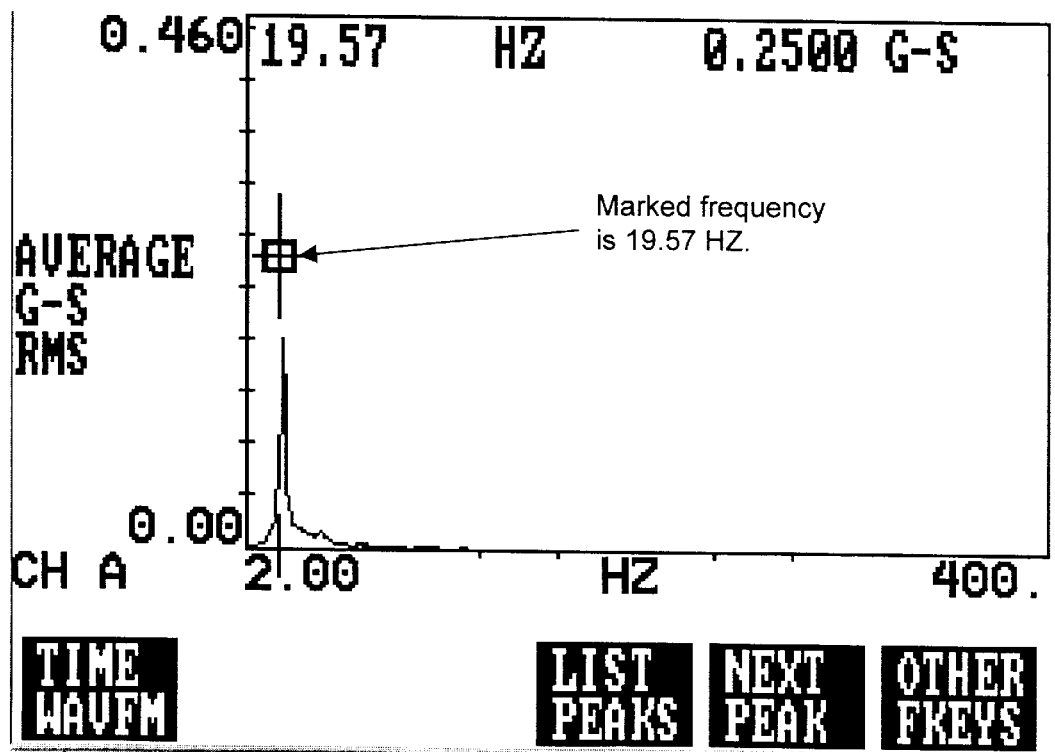

FIG. 15 depicts the display screen showing the spectral data collected by the Bump Test (Equipment Off) expert module using the setup parameters listed in the "No Route Data" column of Table IX. As depicted in FIG. 16, the test operator designates a frequency of interest at 19.57 HZ by placing the cursor on the peak and pressing the Mark key 44 on the keyboard 14. Thus, $F_{MARK}$ is set to 19.57 HZ.

To run the bump test again, this time using the marked frequency, the operator again selects the Bump Test (Equipment Off) expert module (FIG. 13) and presses the Enter key 40 (FIG. 1). Referring again to FIG. 14, when the Enter key 40 is pressed, the processor 24 begins execution of the Bump Test (Equipment Off) expert module (step 300). Again, $F_{MAX}$ is set to 400 HZ, acceleration units and a uniform window are selected, and Averages is set to 6, Full Scale Range to 20.0, Pre-Trigger to 10%, and Trigger Level to 0.5 (step 302). In this case, there is again no route data (step 304). However, since there is a marked frequency (step 306), the expert module sets $F_{MAX}$ to be equivalent to 2.5 times $F_{MARK}$ (step 312). In this example, $F_{MAX}$ is set to 50 HZ. The expert module then sets the value of Lines to provide a frequency resolution of no greater than HZ per line (step 308). In this example, Lines is set to 100 which provides a resolution of 0.5 HZ per line. The frequency spectrum data is then acquired again (step 310).

Figure 17:
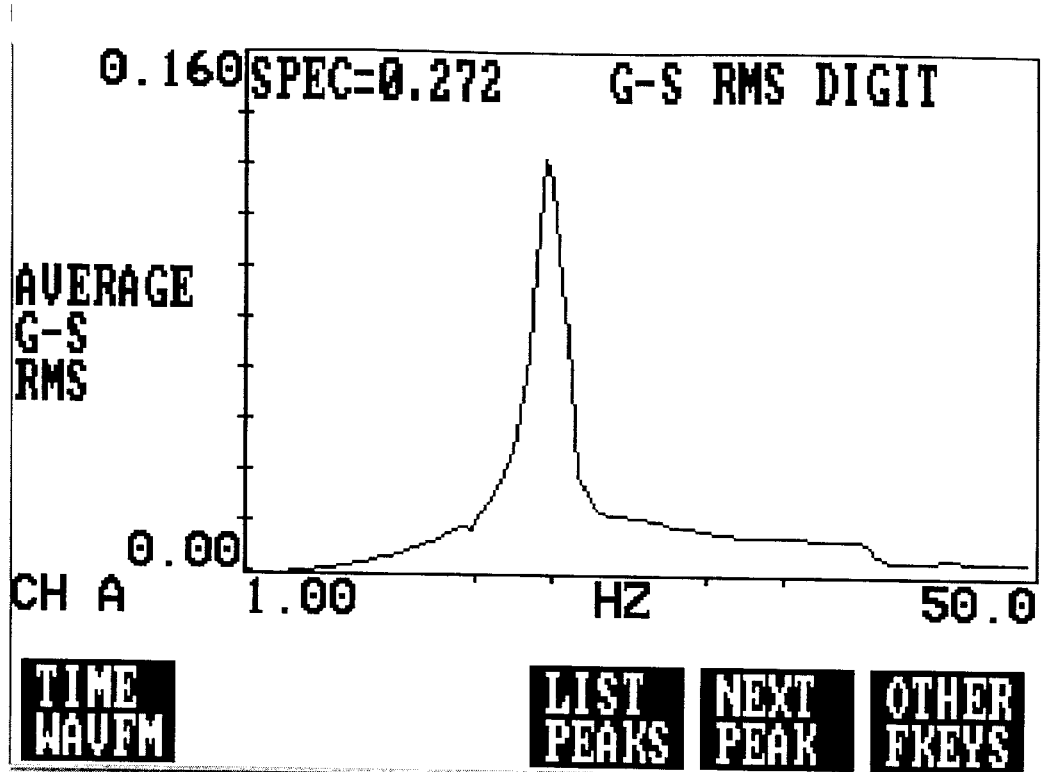

FIG. 17 depicts the display screen showing the spectral data collected by the Bump Test (Equipment Off) expert module for the case of a marked frequency of 19.57 HZ. In this situation, the expert module used the setup parameters listed in the "No Route Data; Marked Frequency" column of Table IX.

As FIG. 17 indicates, the results of the bump test should show a peak at the resonant frequency. Generally, single channel resonance testing requires several tests to confirm the resonant frequency with confidence. The impact of the hammer places a small amount of force into the mechanical system over a wide range of frequencies. The resonance, which occurs over a range of frequencies, naturally amplifies the resulting vibration. The peaks seen in the spectral data represent the resonant frequency. Typically, when these resonant frequencies are known, the machines are operated so as to avoid operational frequencies that coincide with the resonant frequencies, because otherwise the input forces will be amplified causing excessively high vibration.

TABLE IX

Example of Bump Test (Equipment Off) Expert Parameters

| Parameter Name | No Route Point | Marked Frequency |
|---|---|---|
| Frequency | 400 Hz | 50 HZ |
| Low Cutoff | 0.0 | 0.0 |
| Lines | 400 | 100 |
| Window | Uniform | Uniform |
| Averages | 6 | 6 |
| Init Setup | No | No |
| Integ Mode | Digital | Digital |
| Units | Acceleration | Acceleration |
| Averaging Mode | Normal | Normal |
| Trig Mode | Pre-trigger | Pre-trigger |
| Trig Level | 0.5 | 0.5 |
| % Pre-trig | 10 | 10 |
| Fixed Scale Range | 20 | 20 |
| SST | No | No |
| A-Weighting | No | No |
| Triax Control | Off | Off |
| Demodulation | No | No |
| PeakVue | No | Yes |
| Prefilter | Off | Off |

The Peak Phase Coastdown expert module is also used to determine natural resonances in the machine under test by plotting the amplitude and phase vibration response at the 1×RPM frequency. This test requires use of the tachometer input 36 whose source is the shaft turning speed. The goal is to have the operational vibration excite the resonance frequencies in the system as the machine coasts to a stop after removing power to the machine. The data collection should begin before power is removed. In the preferred embodiment of the invention, this expert module is used when there is route data present.

Figure 18:
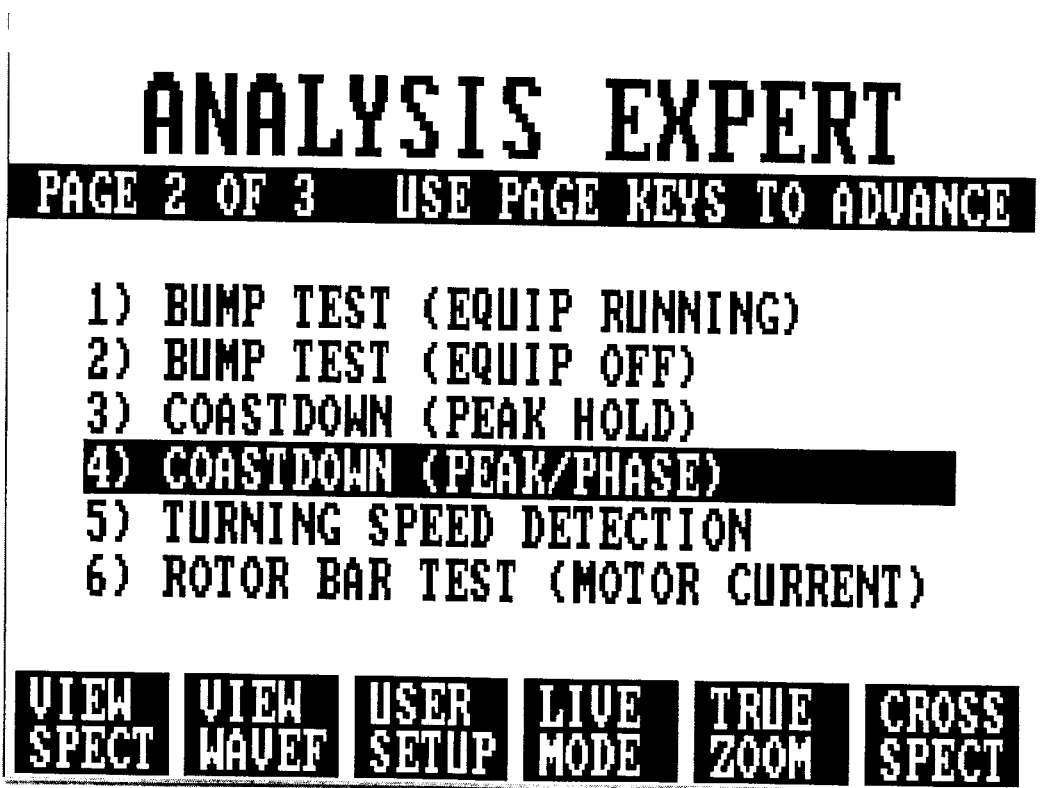
FIG. 18 depicts a display screen for selecting an expert analysis module according to a preferred embodiment of the invention.

To run the expert, the operator presses the Analyze button 38 on the analyzer 10, and proceeds to the second page of the listing of available expert modules, as depicted in the screen display of FIG. 18. The operator then selects the Coastdown (Peak/Phase) expert from the list and presses the Enter key 40.

Figure 19:
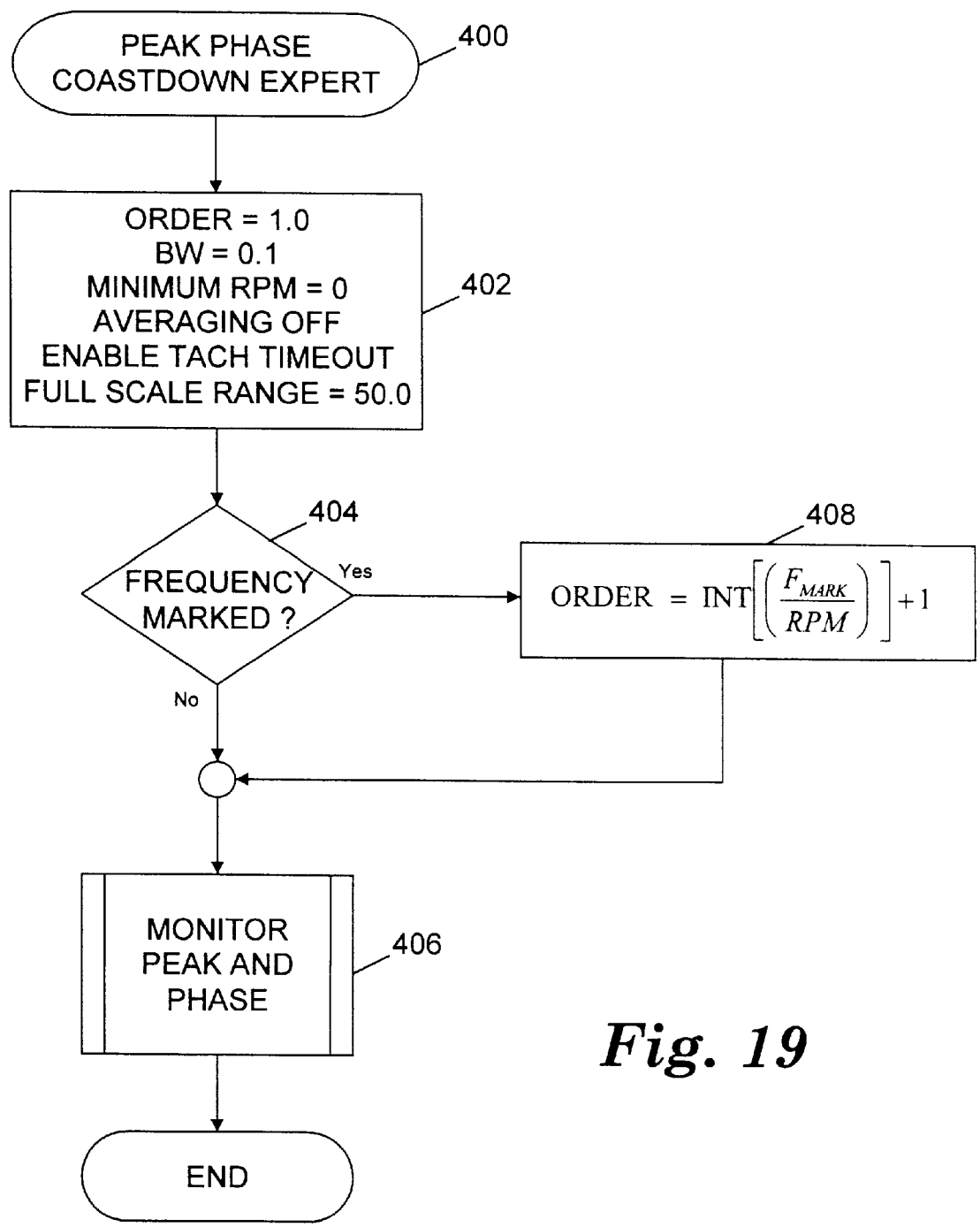
FIG. 19 is a flow diagram depicting the operation of a Peak Phase Coastdown expert analysis module according to a preferred embodiment of the invention.
Figure 20:
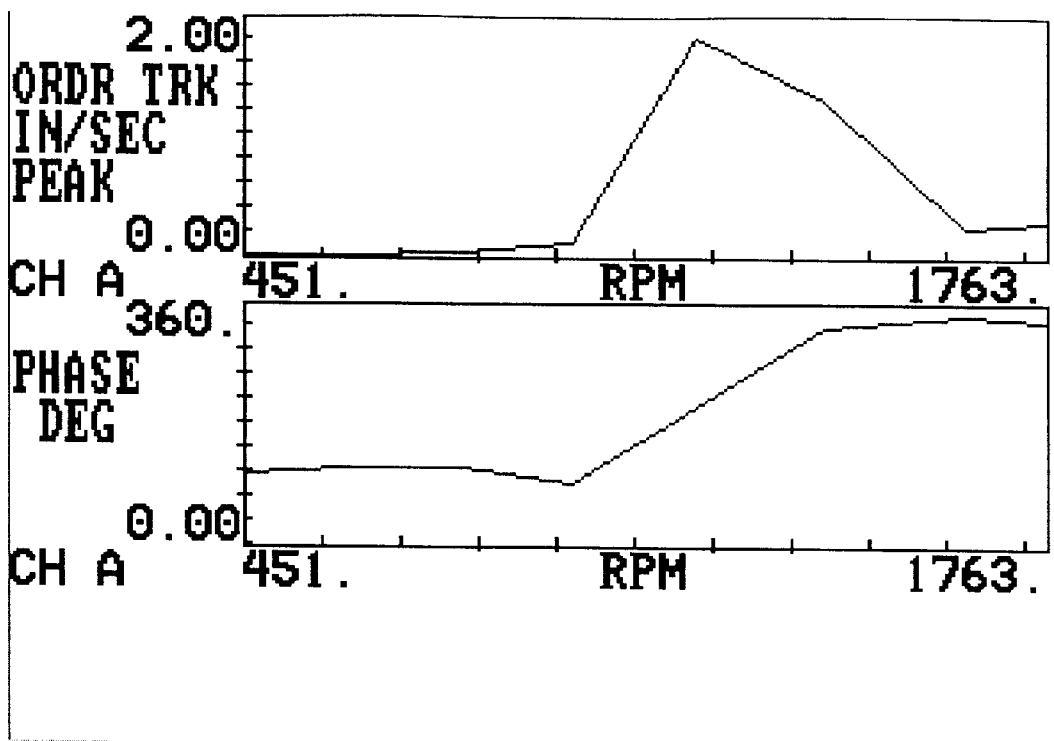
FIGS. 20, 21, and 22 depict display screens showing vibration spectral data according to a preferred embodiment of the invention.

Referring now to FIG. 19, when the operator presses the Enter key 40, the processor 24 begins execution of the Peak Phase Coastdown expert module (step 400). In the preferred embodiment, the expert module first sets Order to 1.0, bandwidth to 0.1, Minimum RPM to 0, turns averaging off, enables the Tach Timeout, and sets the Full Scale Range to 50.0 (step 402). If no frequency has been marked on a previously acquired spectrum (step 404), then the expert module proceeds to activate the analyzer 10 to monitor the amplitude peak and phase of the vibration response of the machine (step 406). As the analyzer 10 collects the vibration data, the test operator removes power to the machine, so that the machine coasts to a stop. FIG. 20 depicts an example of a screen displayed during the coastdown test.

Figure 21:
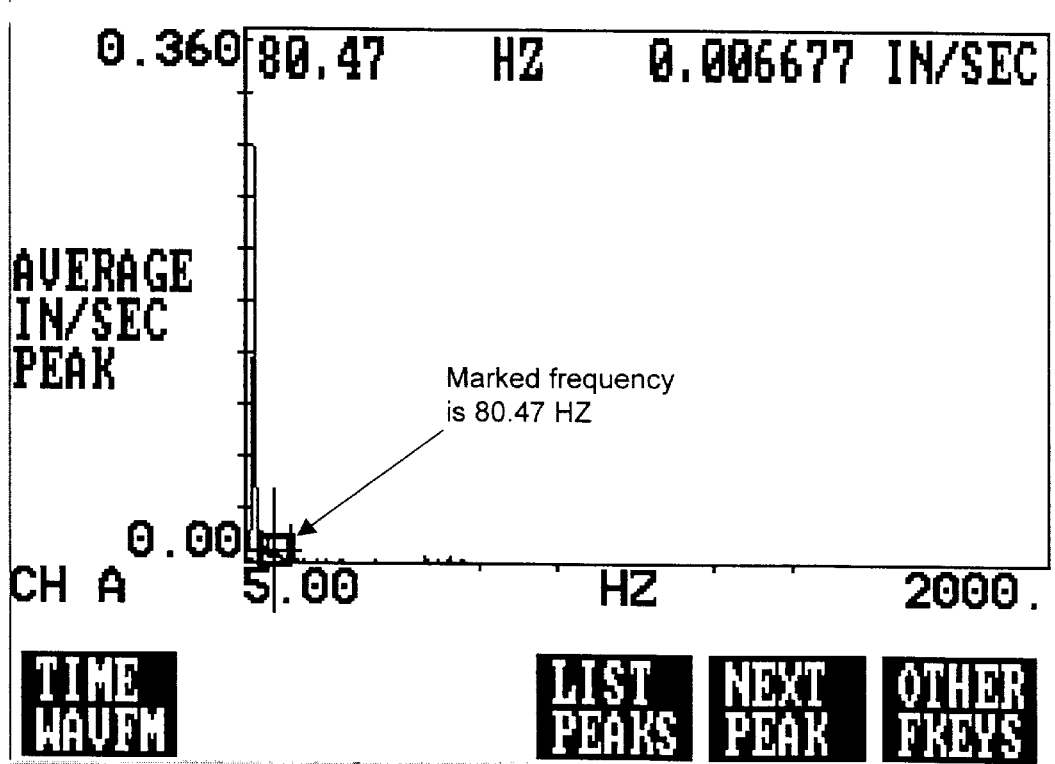

If the test operator had marked a frequency of interest on a previously-collected spectrum, the expert module sets Order according to:

$$\text{ORDER} = INT\left[\left(\frac{F_{MARK}}{RPM}\right)\right] + 1 \text{ (step 408)},$$

where RPM is the revolutions per minute of the machine based upon the tachometer signal provided at the tachometer input 36. For example, as shown in FIG. 21, the operator may have marked a frequency of 80.47 HZ in the route data spectral display. In this situation, if RPM is 30 HZ, Order is determined to be:

$$\text{ORDER} = INT\left[\left(\frac{80.47 \text{ HZ}}{30 \text{ HZ}}\right)\right] + 1 = 3.$$

Figure 22:
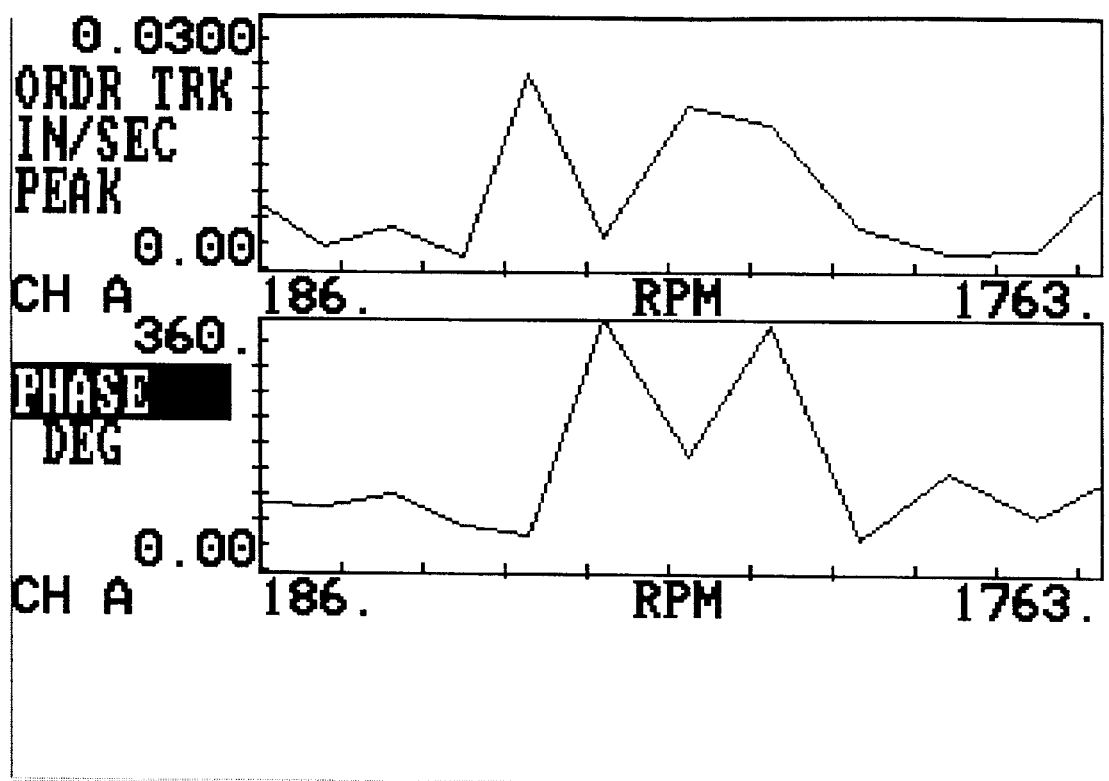

Thus, in this example, the expert module measures the third harmonic of the turning speed frequency as the machine coasts down. FIG. 22 depicts an example of a screen displayed during the coastdown test when using the marked frequency of 80.47 HZ.

The setup parameters used by the expert in performing the coastdown tests, with and without a marked frequency, are listed in Table X.

TABLE X

Example Peak Phase Coastdown Expert Parameters

| Parameter Name | Route Data; No Marked Frequency | Route Data; Marked Frequency |
|---|---|---|
| Order | 1 | 3 |
| Bandwidth | 0.1 | 0.1 |
| Averager enabled | No | No |
| Minimum RPM | 0 | 0 |
| Tach Time Out | Yes | Yes |
| Full Scale Range | 50 | 50 |
| Integ Mode | Digital | Digital |
| Units | Velocity | Velocity |

As shown in FIGS. 20 and 22, the spectral data collected by the Peak Phase Coastdown expert indicates a peak in the data corresponding to the resonance in the machine under test. An additional benefit of this test is that the phase shift at the multiple of the turning speed may be known. At a resonance, the phase goes through a 180 degree phase shift. This data is very useful in confirming the resonant frequency.

Turning Speed Detection

The turning speed detection expert module is used in conjunction with measurements taken for variable speed machines, such as variable speed electric motors. If the user is measuring a variable speed machine, the analyzer 10 prompts the user for the equipment turning speed. The analyzer 10 looks for the presence of a tachometer signal at connector 17 (FIG. 1) and if no tach signal is present, the analyzer 10 prompts the user to enter a suspected turning speed of the machine. After the user's best estimate of turning speed is input, the analyzer 10 collects and analyzes data to determine a detected turning speed. A spectrum is then displayed on the analyzer's display 12 with the detected turning speed peak marked. The user has the option of accepting or rejecting the detected turning speed. If accepted, the detected turning speed is stored for the equipment and the user returns to the main data collection menu to continue with the collection of route data for the variable speed equipment. The user may also invoke this module by manual selection from the main menu.

One benefit of a turning speed detection expert according to the invention is that it enables the analyzer 10 to detect actual turning speed with a high degree of accuracy without the benefit of a tachometer signal. The user simply inputs his best estimate of what the turning speed should be, and the analyzer 10 finds the actual turning speed based on the user's best estimate.

Another feature offered by each of the expert modules is the labeling of spectral data collected by the expert to indicate which expert was used to collect the data. For example, when the Bearing/Gear PeakVue expert is used to collect spectral data, the expert module attaches a label field to the spectral data file that is stored in the memory 26. When the spectral data file is later downloaded from the memory 26 in the analyzer 10 to a database on the base computer 34, the label field distinguishes the expert-collected data from standard route data in the database. For example, FIG. 23 depicts a display screen which may be generated by a database or data analysis program running on the base computer. Note that the eighth and ninth spectral data sets listed in FIG. 23 include labels indicating which expert modules were used in collecting the data.

The analyzer uniquely identifies the data collected by the Analysis Experts as a "special test" collected by a specific expert. The communications program interprets this unique identification and passes this identification of the "special test" data back to the PC for storage, post analysis, and processing. This allows PC-based expert analysis programs, such as one provided by Computational Systems, Inc. of Knoxville, Tennessee under the trade name Nspectr®, to interpret the "special test" data collected by the specific expert as special data, thus providing for the ability to improve the expert system's overall diagnosis.

It is contemplated, and will be apparent to those skilled in the art from the preceding description and the accompanying drawings that modifications and/or changes may be made in the embodiments of the invention. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. A hand-held apparatus for gathering and analyzing test data associated with rotating machines, the apparatus operable to be carried by an operator from one machine to another along a test route, the test data indicative of one or more operational characteristics of the rotating machines, the apparatus comprising:
   a sensor input port for receiving a sensor signal from a sensor, the sensor signal indicative of one or more operational characteristics of the rotating machines;
   signal conditioning means for receiving the sensor signal, and for conditioning the sensor signal to produce a conditioned signal which is appropriate in format to be digitally processed;
   a processor coupled to the signal conditioning means for receiving and processing the conditioned signal according to processing instructions and processing parameters to produce a test spectrum, where the processing parameters correspond to one or more characteristics of the test spectrum;
   a memory device coupled to the processor for storing a plurality of executable test expert modules, each of the test expert modules containing the processing instructions for processing the conditioned signal in a particular way to determine one or more of the operational characteristics of the rotating machines;
   an operator input device coupled to the processor for receiving input from the operator to select one of the test expert modules to be executed to process the conditioned signal according to the processing instructions contained in the test expert module selected; and
   a display device for displaying the test results to the operator.

2. The apparatus of claim 1 further comprising the test expert modules containing processing instructions for determining whether the processing parameters have been set according to a predetermined configuration for a particular test point on the test route, and for processing the conditioned signal in a way dependent upon whether or not the processing parameters have been set according to a predetermined configuration for a particular test point on the test route.

3. The apparatus of claim 2 further comprising at least one of the test expert modules containing processing instructions for setting a maximum frequency of the test spectrum based upon whether the processing parameters have been set according to a predetermined configuration for a particular test point on the test route.

4. The apparatus of claim 2 further comprising at least one of the test expert modules containing processing instructions for setting a frequency resolution of the test spectrum based upon whether the processing parameters have been set according to a predetermined configuration for a particular test point on the test route.

5. The apparatus of claim 2 further comprising:
   the operator input device further for selecting a frequency within the test spectrum to be a designated frequency; and
   at least one of the test expert modules containing processing instructions for setting a maximum frequency of the test spectrum based upon whether the operator has selected a designated frequency.

6. The apparatus of claim 5 further comprising at least one of the test expert modules containing processing instructions for setting a maximum frequency of the test spectrum based upon a value of the designated frequency.

7. The apparatus of claim 2 further comprising:
   the operator input device further for selecting a frequency within the test spectrum to be a designated frequency; and
   at least one of the test expert modules containing processing instructions for setting a frequency resolution of the test spectrum based upon whether the operator has selected a designated frequency.

8. The apparatus of claim 7 further comprising at least one of the test expert modules containing processing instructions for setting a frequency resolution of the test spectrum based upon a value of the designated frequency.

9. The apparatus of claim 1 further comprising:
   the memory device for storing a turning speed detection test expert module having the processing instructions for processing the conditioned signal to determine a detected turning speed of the rotating machine;
   the operator input device for receiving from the operator an estimated turning speed of the rotating machine;
   the processor for executing the turning speed detection test expert module to analyze the test spectrum based on the estimated turning speed to determine the detected turning speed of the rotating machine;
   the display device for displaying the detected turning speed to the operator; and
   the operator input device further for receiving input from the operator concerning whether to accept the detected turning speed as being an actual turning speed of the rotating machine.

10. A hand-held apparatus for gathering and analyzing test data associated with rotating machines, the apparatus operable to be carried by an operator from one machine to another along a test route, the test data indicative of one or more operational characteristics of the machines, the apparatus comprising:

a sensor input port for receiving a sensor signal from a sensor, the sensor signal indicative of the actual turning speed of a machine along the route;

signal conditioning means for receiving the sensor signal, and for conditioning the sensor signal to produce a conditioned signal which is appropriate in format to be digitally processed;

an operator input device for receiving from the operator an estimated turning speed of the machine;

a processor coupled to the signal conditioning means for receiving and processing the conditioned signal to determine a detected turning speed of the machine;

a display device for displaying the detected turning speed to the operator; and the operator input device further for receiving input from the operator concerning whether to accept the detected turning speed as being the actual turning speed of the machine.

11. The apparatus of claim 10 further comprising:

the processor for processing the conditioned signal to produce a test spectrum, and for determining the detected turning speed of the machine based on the test spectrum; and the display device for displaying the test spectrum to the operator with the detected turning speed marked on the test spectrum.

12. A method for controlling a hand-held machine analyzer to analyze faults in rotating machines, where the analyzer is operable to be carried by an operator from one machine to another along a machine testing route, and where the analyzer includes a sensor for generating sensor signals, conditioning circuits for conditioning the sensor signals to produce conditioned signals appropriate in format to be digitally processed, a processor for processing the conditioned signals according to processing parameters to produce measurement data, a display device for displaying the measurement data to the operator, and an input device for receiving input instructions from the operator, the method comprising:

(a) receiving conditioned signals from the conditioning circuits while the sensor is positioned at a test point on the machine;

(b) processing the conditioned signals according to initial processing parameters to produce initial measurement data;

(c) displaying the initial measurement data to the operator on the display device, where the initial measurement data is indicative of a machine condition;

(d) displaying a list of expert analysis routines from which the operator may select to aid in further analyzing the machine condition;

(e) receiving input instructions from the operator indicating a selected one of the expert analysis routines;

(f) executing the selected expert analysis routine and thereby:

(f1) determining, based on the initial measurement data, subsequent processing parameters to use in subsequent processing of the conditioned signals; and (f2) processing the conditioned signals according to the subsequent processing parameters determined in step (f1) to produce subsequent measurement data, where the subsequent measurement data is more indicative of the machine condition than is the initial measurement data; and (g) displaying the subsequent measurement data to the operator on the display device.

13. The method of claim 12 further comprising:

(h) again displaying the list of expert analysis routines from which the operator may select to aid in further analyzing the machine condition;

(i) receiving input instructions from the operator indicating a selected expert analysis routine;

(j) executing the selected expert analysis routine and thereby:

(j1) determining, based on previous measurement data, further processing parameters to use in further processing of the conditioned signals; and (j2) processing the conditioned signals according to the further processing parameters determined in step (j1) to produce further measurement data, where the further measurement data is further indicative of the machine condition;

(k) displaying the further measurement data to the operator on the display device;

(l) repeating steps (h) through (k) as necessary to further analyze the machine condition.

14. The method of claim 12 wherein the sensor is a vibration sensor, the conditioned signals are vibration signals, and the initial measurement data represent an initial vibration frequency spectrum, and wherein:

step (b) includes processing the vibration signals using an initial number of lines of resolution;

step (e) includes receiving input instructions from the operator indicating selection of a high-resolution expert analysis routine;

step (f1) includes determining a subsequent number of lines of resolution based upon the initial measurement data; and step (f2) includes processing the vibration signals to produce a high-resolution vibration frequency spectrum having the subsequent number of lines of resolution determined in step (f1), where the subsequent number of lines of resolution of the high-resolution vibration frequency spectrum is greater than the initial number of lines of resolution of the initial vibration frequency spectrum.

15. The method of claim 12 wherein the sensor is a vibration sensor, the conditioned signals are vibration signals, and the initial measurement data represent an initial vibration frequency spectrum, and wherein:

step (e) further includes receiving an input instruction from the operator indicating a marked frequency within the initial vibration frequency spectrum;

step (f1) includes determining a subsequent maximum frequency based upon the marked frequency; and step (f2) includes processing the vibration signals to produce a subsequent vibration frequency spectrum having the subsequent maximum frequency.

16. The method of claim 12 wherein the sensor is a vibration sensor, the conditioned signals are vibration signals, and the initial measurement data represent an initial vibration frequency spectrum, and wherein:

step (e) includes receiving input instructions from the operator indicating selection of a bump-test expert analysis routine;

step (a) includes receiving initial vibration signals after the machine has been impacted near the test point on the machine;

step (b) includes processing the vibration signals according to bump-test processing parameters to produce the initial vibration spectrum;

step (e) further includes receiving an input instruction from the operator indicating a marked frequency within the initial vibration frequency spectrum;

step (f1) includes determining a subsequent maximum frequency based upon the marked frequency;

step (a) includes receiving subsequent vibration signals after the machine has again been impacted near the test point on the machine; and step (f2) includes processing the subsequent vibration signals to produce a subsequent vibration frequency spectrum having the subsequent maximum frequency.

17. The method of claim 12 wherein the sensor is a vibration sensor, the conditioned signals are vibration signals, and the initial measurement data represent an initial vibration frequency spectrum, further comprising:

step (e) including receiving input instructions from the operator indicating selection of a peak phase coast-down expert analysis routine;

step (a) including receiving vibration signals after power to the machine has been removed and as the machine is allowed to coast to a stop;

(h) receiving a tachometer signal indicative of rotational speed of the machine as the machine coasts to a stop;

step (f2) including processing the tachometer and vibration signals to produce vibration amplitude and phase data as a function of the rotational speed of the machine; and step (g) including displaying the vibration amplitude and phase data to the operator on the display device.

18. The method of claim 12 further comprising:

(h) associating a label field with the subsequent measurement data, where the label field indicates which expert analysis routine was executed to produce the subsequent measurement data; and (i) storing the subsequent measurement data and the label field on a storage medium.

19. The method of claim 12 wherein the sensor is a vibration sensor, the conditioned signals are vibration signals, and the initial measurement data represent an initial vibration frequency spectrum, and wherein:

step (e) includes receiving input instructions from the operator indicating selection of an expert analysis routine for further analyzing peaks in the initial vibration spectrum;

step (f2) includes processing the subsequent vibration signals to determine a peak vibration amplitude value during a predetermined sample time period; and step (g) includes displaying the peak vibration amplitude value to the operator on the display device.

20. A method for controlling a hand-held machine analyzer operable to be carried by an operator from one machine to another along a machine testing route, and where the analyzer includes a sensor for generating sensor signals, conditioning circuits for conditioning the sensor signals to produce conditioned signals appropriate in format to be digitally processed, a processor for processing the conditioned signals according to processing parameters to produce measurement data, a display device for displaying the measurement data to the operator, and an input device for receiving input instructions from the operator, the method comprising:

(a) querying the operator to provide an estimated turning speed of the machine;

(b) receiving from the operator an estimated turning speed of the machine;

(c) receiving conditioned signals from the conditioning circuits while the sensor is positioned at a test point on the machine;

(d) analyzing the measurement data based on the estimated turning speed to determine a detected turning speed of the machine;

(e) displaying the detected turning speed to the operator on the display device; and (f) receiving input from the operator concerning whether to accept the detected turning speed as being an actual turning speed of the machine.

* * * * *